(12) United States Patent
Leichter et al.

(10) Patent No.: US 8,027,513 B2
(45) Date of Patent: Sep. 27, 2011

(54) BITMAP TRACKER FOR VISUAL TRACKING UNDER VERY GENERAL CONDITIONS

(75) Inventors: Ido Leichter, Omer (IL); Michael Lindenbaum, Haifa (IL); Ehud Rivlin, Haifa (IL)

(73) Assignee: Technion Research and Development Foundation Ltd., Haifa (IL)

( * ) Notice: Subject to any disclaimer, the term of this patent is extended or adjusted under 35 U.S.C. 154(b) by 1192 days.

(21) Appl. No.: 11/727,157

(22) Filed: Mar. 23, 2007

(65) Prior Publication Data

US 2008/0232643 A1 Sep. 25, 2008

(51) Int. Cl.
*G06K 9/00* (2006.01)

(52) U.S. Cl. .................. 382/103; 348/169; 707/745

(58) Field of Classification Search .................. 382/103, 382/159, 160, 165, 224, 229; 348/169, 208.14; 707/745

See application file for complete search history.

(56) References Cited

U.S. PATENT DOCUMENTS

| | | | |
|---|---|---|---|
| 6,252,608 B1 * | 6/2001 | Snyder et al. .................. 345/473 |
| 6,259,802 B1 | 7/2001 | Jolly et al. |
| 6,337,917 B1 | 1/2002 | Onural et al. |
| 6,400,831 B2 | 6/2002 | Lee et al. |
| 6,574,353 B1 | 6/2003 | Schoepflin et al. |
| 6,785,329 B1 | 8/2004 | Pan et al. |
| 6,912,310 B1 | 6/2005 | Park et al. |
| 7,139,411 B2 * | 11/2006 | Fujimura et al. .................. 382/103 |
| 7,200,243 B2 * | 4/2007 | Keenan et al. .................. 382/100 |
| 7,680,353 B2 * | 3/2010 | Jojic et al. .................. 382/254 |
| 2003/0095707 A1 * | 5/2003 | Colmenarez et al. .................. 382/173 |
| 2006/0285723 A1 * | 12/2006 | Morellas et al. .................. 382/103 |
| 2007/0030998 A1 * | 2/2007 | O'Hara et al. .................. 382/100 |
| 2009/0067730 A1 * | 3/2009 | Schneiderman .................. 382/224 |
| 2010/0040148 A1 * | 2/2010 | Marpe et al. .................. 375/240.16 |

FOREIGN PATENT DOCUMENTS

| | | |
|---|---|---|
| WO | WO 98/35501 | 8/1998 |
| WO | WO 99/63750 | 12/1999 |
| WO | WO 00/18128 | 3/2000 |

OTHER PUBLICATIONS

Correa et al. ("Silhouette-Based Probabilistic 2D Human Motion Estimation for Real-Time Application", IEEE, image processing, 2005).*

* cited by examiner

*Primary Examiner* — Jason M Repko
*Assistant Examiner* — Shervin Nakhjavan
(74) *Attorney, Agent, or Firm* — Browdy and Neimark, PLLC

(57) ABSTRACT

System and method for visually tracking a target object silhouette in a plurality of video frames under very general conditions. The tracker does not make any assumption about the object or the scene. The tracker works by approximating, in each frame, a PDF (probability distribution function) of the target's bitmap and then estimating the maximum a posteriori bitmap. The PDF is marginalized over all possible motions per pixel, thus avoiding the stage in which optical flow is determined. This is an advantage over other general-context trackers that do not use the motion cue at all or rely on the error-prone calculation of optical flow. Using a Gibbs distribution with a first order neighborhood system yields a bitmap PDF whose maximization may be transformed into that of a quadratic pseudo-Boolean function, the maximum of which is approximated via a reduction to a maximum-flow problem.

16 Claims, 5 Drawing Sheets

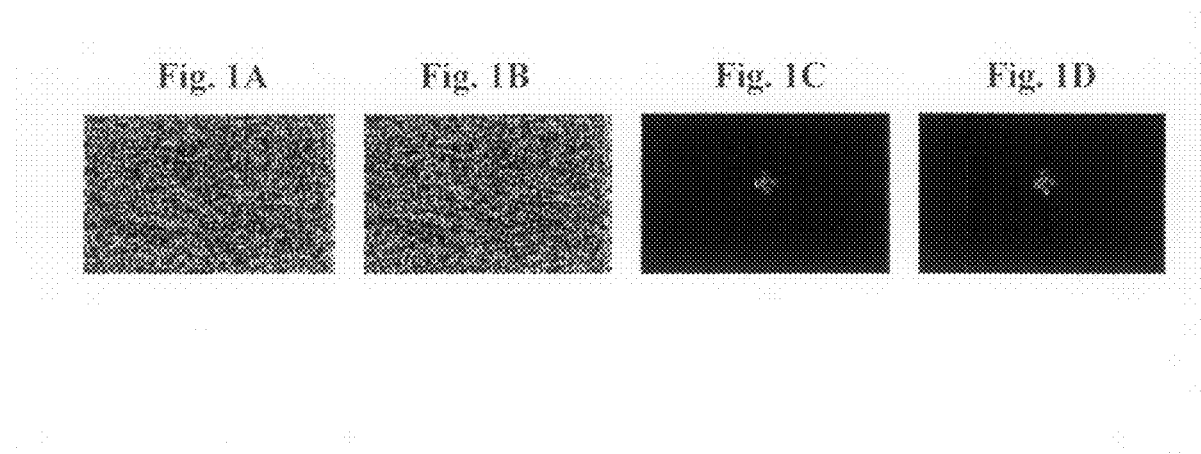
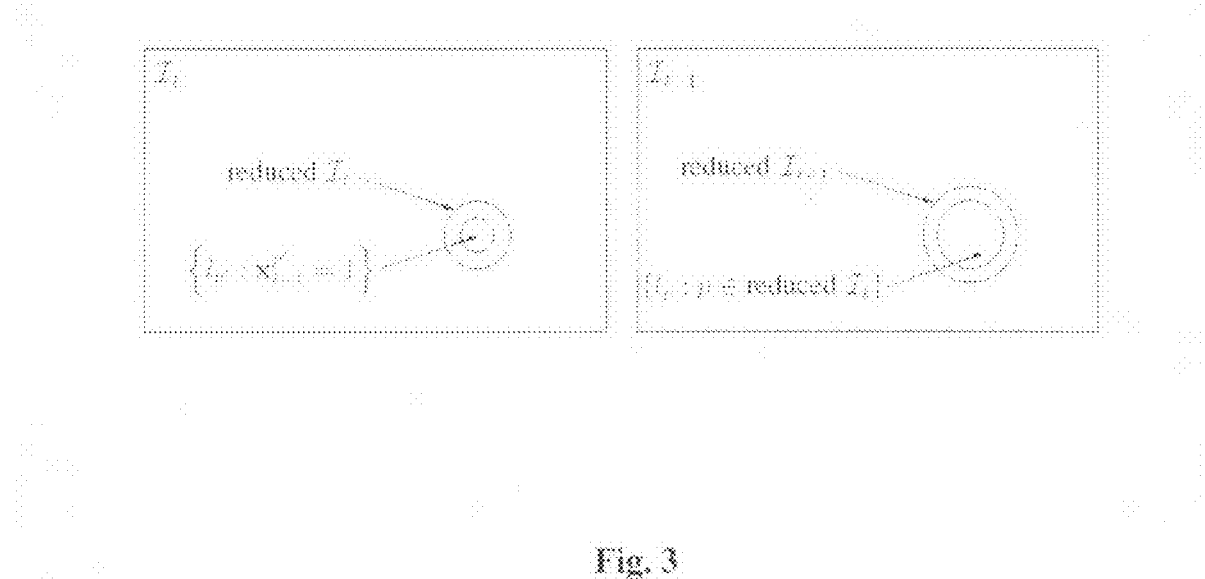
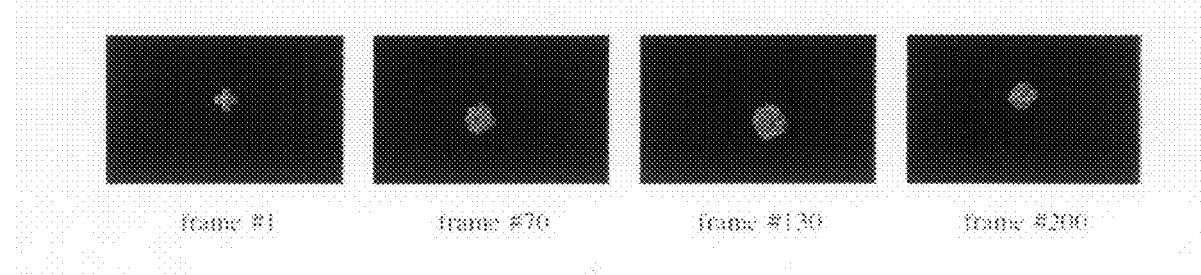

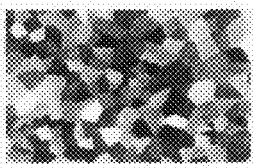 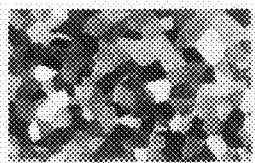 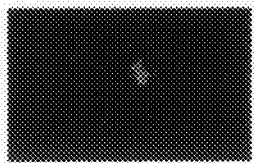 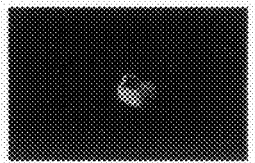
Fig. 4A   Fig. 4B   Fig. 4C   Fig. 4D
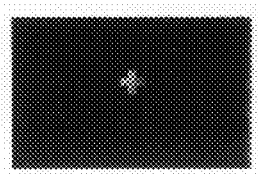 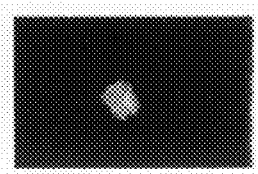 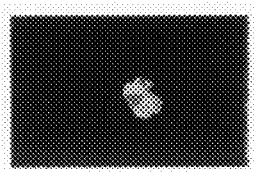 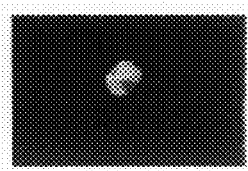
frame #1   frame #70   frame #130   frame #200
Fig. 5
 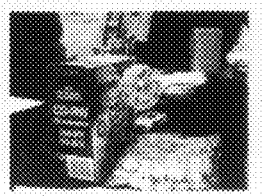  
frame #1   frame #17   frame #35   frame #52
Fig. 6 frame #1  frame #24  frame #52  frame #70 frame #1  frame #300  frame #450  frame #570 frame #1  frame #47  frame #100  frame #118

BITMAP TRACKER FOR VISUAL TRACKING UNDER VERY GENERAL CONDITIONS

FIELD OF THE INVENTION

The present invention relates to visual tracking of an object silhouette in a video, and more particularly to visual tracking under very general conditions: a possibly non-rigid target whose appearance may drastically change over time; general camera motion; a 3D scene; and no a priori information regarding the target or the scene except for the target's bitmap in the first frame, used to initialize the tracker.

BACKGROUND OF THE INVENTION

Relevant previous work is mainly in the area of video segmentation. However, very few video segmentation algorithms are intended for the very general context discussed here. Most were developed in the context of a stationary camera (e.g., [P. Kornprobst and G. Medioni. Tracking segmented objects using tensor voting. In Proceedings of the 2000 IEEE Computer Society Conference on Computer Vision and Pattern Recognition, volume 2, pages 118-125, 2000], [. Paragios and R. Deriche. A PDE-based level-set approach for detection and tracking of moving objects. In Proceedings of the 6th IEEE International Conference on Computer Vision, pages 1139-1145, 1998], [H. Y. Wang and K. K. Ma. Automatic video object segmentation via 3D structure tensor. In Proceedings of the 2003 IEEE International Conference on Image Processing, volume 1, pages 153-156, 2003]) or under the assumption that the background has a global, parametric motion (e.g., affine [F. Precioso, M. Barlaud, T. Blu, and M. Unser. Robust real-time segmentation of images and videos using a smooth-spline snake-based algorithm. Image Processing, 14(7):910-924, 2005] or projective [H. Tao, H. S. Sawhney, and R. Kumar. Object tracking with Bayesian estimation of dynamic layer representations. IEEE Transactions on Pattern Analysis and Machine Intelligence, 24(1):75-89, 2002], [Y. Tsaig and A. Averbuch. Automatic segmentation of moving objects in video sequences: a region labeling approach. IEEE Transactions on Circuits, Systems, and Video, 12(7):597-612, 2002].) Recently, the last restriction was relaxed to a planar scene with parallax [J. Kang, I. Cohen, G. Medioni, and C. Yuan. Detection and tracking of moving objects from a moving platform in presence of strong parallax. In Proceedings of the 10th IEEE International Conference on Computer Vision, pages 10-17, 2005]. Other algorithms were constrained to track video objects modeled well by parametric shapes (e.g., active blobs [S. Sclaroff and J. Isidoro. Active blobs: region-based, deformable appearance models. Computer Vision and Image Understanding, 89(2): 197-225, 2003]) or motion (e.g., translation [R. Cucchiara, A. Prati, and R. Vezzani. Real-time motion segmentation from moving cameras. Real-Time Imaging, 10(3):127-143, 2004], 2D rigid motion [H. Tao, H. S. Sawhney, and R. Kumar. Object tracking with Bayesian estimation of dynamic layer representations. IEEE Transactions on Pattern Analysis and Machine Intelligence, 24(1):75-89, 2002], affine [M. Gelgon and P. Bouthemy. A region-level motion-based graph representation and labeling for tracking a spatial image partition. Pattern Recognition, 33(4):725-740, 2000], [I. Patras, E. A. Hendriks, and R. L. Lagendijk. Video segmentation by MAP labeling of watershed segments. IEEE Transactions on Pattern Analysis and Machine Intelligence, 23(3):326-332, 2001], projective [C. Gu and M. C. Lee. Semiautomatic segmentation and tracking of semantic video objects. IEEE Transactions on Circuits, Systems, and Video, 8(5):572-584, 1998], small 3D rigid motion [T. Papadimitriou, K. I. Diamantaras, M. G. Strintzisa, and M. Roumeliotis. Video scene segmentation using spatial contours and 3-D robust motion estimation. IEEE Transactions on Circuits, Systems, and Video, 14(4):485-497, 2004] and normally distributed optical flow [S. Khan and M. Shah. Object based segmentation of video using color, motion and spatial information. In Proceedings of the 2001 IEEE Computer Society Conference on Computer Vision and Pattern Recognition, volume 2, pages 746-751, 2001], [Y. P. Tsai, C. C. Lai, Y. P. Hung, and Z. C. Shih. A Bayesian approach to video object segmentation via 3-D watershed volumes. IEEE Transactions on Circuits, Systems, and Video, 15(1):175-180, 2005]). These algorithms are suitable only for tracking rigid objects or specific preset types of deformations. The algorithm of the invention, however, addresses the tracking of potentially non-rigid objects in 3D scenes from an arbitrarily moving camera, without prior knowledge other than the object's bitmap in the first frame.

There are algorithms that address video segmentation and successfully track objects under general conditions as an aftereffect. That is, they do not perform explicit tracking in the sense of estimating a current state conditional on the previous one or on the previous frames. For example, in [J. Shi and J. Malik. Motion segmentation and tracking using normalized cuts. In Proceedings of the 6th IEEE International Conference on Computer Vision, pages 1154-1160, 1998] each set of a few (five) consecutive frames is spatiotemporally segmented without considering the previous results (other than saving calculations.) In [Y. Liu and Y. F. Zheng. Video object segmentation and tracking using $\psi$-learning classification. IEEE Transactions on Circuits, Systems, and Video, 15(7):885-899, 2005] each frame is segmented into object/background without considering previous frames or classifications. (Furthermore, the classification requires a training phase, upon which the classification is performed, prohibiting major changes in the target's appearance.) In the contour tracking performed in [S. Jehan-Besson, M. Barlaud, and G. Aubert. DREAM$^2$S: Deformable regions driven by an eulerian accurate minimization method for image and video segmentation. International Journal of Computer Vision, 53(1): 45-70, 2003], an active contour is run in each frame separately, while the only information taken from previous frames is the previously estimated contour for initialization in the current frame. According to the invention, the state (target's bitmap) is explicitly tracked by approximating a PDF of the current state, which is conditional on the previous state and on the current and previous frames, and by estimating the MAP state.

Optical flow is an important cue for visually tracking objects, especially under general conditions. Most video segmentation algorithms make a point estimate of the optical flow, usually prior to segmentation (e.g., [R. Cucchiara, A. Prati, and R. Vezzani. Real-time motion segmentation from moving cameras. Real-Time Imaging, 10(3):127-143, 2004], [M. Gelgon and P. Bouthemy. A region-level motion-based graph representation and labeling for tracking a spatial image partition. Pattern Recognition, 33(4):725-740, 2000], [C. Gu and M. C. Lee. Semiautomatic segmentation and tracking of semantic video objects. IEEE Transactions on Circuits, Systems, and Video, 8(5):572-584, 1998], [S. Khan and M. Shah. Object based segmentation of video using color, motion and spatial information. In Proceedings of the 2001 IEEE Computer Society Conference on Computer Vision and Pattern Recognition, volume 2, pages 746-751, 2001], [V. Mezaris, I. Kompatsiaris, and M. G. Strintzis. Video object segmentation using Bayes-based temporal tracking and trajectory-based region merging. IEEE Transactions on Circuits, Systems, and Video, 14(6):782-795, 2004], [H. T. Nguyen, M. Worring, R. van den Boomgaard, and A. W. M. Smeulders. Tracking nonparameterized object contours in video. Image Processing, 11(9):1081-1091, 2002], [T. Papadimitriou, K. I. Diamantaras, M. G. Strintzisa, and M. Roumeliotis. Video scene segmentation using spatial contours and 3-D robust motion estimation. IEEE Transactions on Circuits, Systems, and Video, 14(4):485-497, 2004], [I. Patras, E. A. Hendriks, and R. L. Lagendijk. Semi-automatic object-based video segmentation with labeling of color segments. Signal Processing: Image Communications, 18(1):51-65, 2003], [Y. P. Tsai, C. C. Lai, Y. P. Hung, and Z. C. Shih. A Bayesian approach to video object segmentation via 3-D watershed volumes. IEEE Transactions on Circuits, Systems, and Video, 15(1):175-180, 2005], [Y. Tsaig and A. Averbuch. Automatic segmentation of moving objects in video sequences: a region labeling approach. IEEE Transactions on Circuits, Systems, and Video, 12(7):597-612, 2002]) and seldom in conjunction with it (e.g, [I. Patras, E. A. Hendriks, and R. L. Lagendijk. Video segmentation by MAP labeling of watershed segments. IEEE Transactions on Pattern Analysis and Machine Intelligence, 23(3):326-332, 2001]). An exception is [M. Nicolescu and G. Medioni. Motion segmentation with accurate boundaries—a tensor voting approach. In Proceedings of the 2003 IEEE Computer Society Conference on Computer Vision and Pattern Recognition, volume 1, pages 382-389, 2003], where each pixel may be assigned multiple flow vectors of equal priority. However, the segmentation there is only applied to consecutive image pairs. Furthermore, the objects in all three experiments were rigid and either the camera or the entire scene was static. Since optical flow estimation is prone to error, other algorithms avoid it altogether (e.g., [S. Jehan-Besson, M. Barlaud, and G. Aubert. DREAM²S: Deformable regions driven by an eulerian accurate minimization method for image and video segmentation. International Journal of Computer Vision, 53(1):45-70, 2003], [Y. Liu and Y. F. Zheng. Video object segmentation and tracking using Ã-learning classification. IEEE Transactions on Circuits, Systems, and Video, 15(7):885-899, 2005], [A. R. Mansouri. Region tracking via level set PDEs without motion computation. IEEE Transactions on Pattern Analysis and Machine Intelligence, 24(7):947-961, 2002.], [S. Sun, D. R. Haynor, and Y. Kim. Semiautomatic video object segmentation using Vsnakes. IEEE Transactions on Circuits, Systems, and Video, 13(1):75-82, 2003]), but these algorithms tend to fail when the target is in proximity to areas of similar texture, and may erroneously classify newly appearing regions with different textures. This is shown in an example in [A. R. Mansouri. Region tracking via level set PDEs without motion computation. IEEE Transactions on Pattern Analysis and Machine Intelligence, 24(7):947-961, 2002], where occlusions and newly appearing areas are prohibited due to the modeling of image domain relations as bijections. Another exception to the optical flow point-estimation is [J. Shi and J. Malik. Motion segmentation and tracking using normalized cuts. In Proceedings of the 6th IEEE International Conference on Computer Vision, pages 1154-1160, 1998], where a motion pro le vector that captures the probability distribution of image velocity is computed per pixel, and motion similarity of neighboring pixels is approximated from the resemblance of their motion pro les. In the work here, the optical flow is neither estimated as a single hypothesis nor discarded, but the bitmap's PDF is constructed through a marginalization over all possible pixel motions (under a maximal flow assumption).

One class of video segmentation and tracking algorithms copes with general object shapes and motions in the context of an arbitrarily moving camera by tracking a nonparametric contour influenced by intensity/color edges (e.g., [S. Sun, D. R. Haynor, and Y. Kim. Semiautomatic video object segmentation using Vsnakes. IEEE Transactions on Circuits, Systems, and Video, 13(1):75-82, 2003]) and motion edges (e.g., [H. T. Nguyen, M. Worring, R. van den Boomgaard, and A. W. M. Smeulders. Tracking nonparameterized object contours in video. Image Processing, 11(9):1081-1091, 2002].) However, this kind of algorithm does not deal well with cluttered objects and partial occlusions, and may cling to irrelevant features in the face of color edges or additional moving edges in proximity to the tracked contour.

Many video segmentation and tracking algorithms perform spatial segmentation of each frame as a preprocessing step. The resulting segments of homogeneous color/intensity are then used as atomic regions composing objects (e.g., [R. Cucchiara, A. Prati, and R. Vezzani. Real-time motion segmentation from moving cameras. Real-Time Imaging, 10(3): 127-143, 2004], [M. Gelgon and P. Bouthemy. A region-level motion-based graph representation and labeling for tracking a spatial image partition. Pattern Recognition, 33(4):725-740, 2000], [I. Patras, E. A. Hendriks, and R. L. Lagendijk. Video segmentation by MAP labeling of watershed segments. IEEE Transactions on Pattern Analysis and Machine Intelligence, 23(3):326-332, 2001].) These algorithms also assign a parametric motion per segment. Rather than confining the final solution in a preprocessing step and making assumptions regarding the type of motion the segments undergo, the algorithm proposed here uses the aforementioned spatial color coherence assumption and works directly at pixel level.

SUMMARY OF THE INVENTION

Much research has been done in the field of visual tracking, bearing fruit to an abundance of visual trackers, but very few trackers were intended for a general context with no a priori information about the tracked object or scene. The vast majority of existing trackers, in order to reduce computational load and enhance robustness are restricted to some a priori known context. These trackers use some (possibly updatable [A. D. Jepson, D. J. Fleet, and T. F. El-Maraghi. Robust online appearance models for visual tracking. IEEE Transactions on Pattern Analysis and Machine Intelligence, 25(10):1296-1311, 2003]) appearance model or shape model for the tracked object in the images and they track in a low-dimensional state space of the target's parameters (e.g., via Condensation [M. Isard and A. Blake. Condensation—conditional density propagation for visual tracking. International Journal of Computer Vision, 29(1):5-28, 1998].) For example, in [P. P'erez, C. Hue, J. Vermaak, and M. Gangnet. Color-based probabilistic tracking. In Proceedings of the 7th European Conference on Computer Vision, pages 661-675, 2002] it is both assumed that the color histogram of the target does not change very much over time and that the target's 2D shape in the image may change only in scale. These trackers are effective only in the context for which they were designated. That is, as long as the target obeys the model in terms of appearance and shape, the tracker will be robust. However, once the target ceases to obey the model, the tracking is likely to fail without recovery. This might be caused by unmodeled factors such as object deformations, change in viewing direction, partial occlusions, and spatially or temporally varying lighting. Thus, such context-specific. trackers are not suitable under the aforementioned general conditions.

The seminal results by Julesz have shown that humans are able to visually track objects merely by clustering regions of similar motion [B. Julesz. Foundations of Cyclopean Perception. The University of Chicago Press. 1971]. As an extreme case, consider FIGS. 1A and 1B. These two images constitute a consecutive pair of images in a video displaying a random-dot object moving in front of a random-dot background that is moving as well. Since the patterns on the object, on the background, and around the object's enclosing contour are all alike the object is indistinguishable from the background for the observer who is exposed to these images at nonconsecutive times. However, if these two images are presented one after the other in the same place, as in a video, the observer is able to extract the object in the two images, shown in FIGS. 1C and 1D.

On the basis of this observation, it is an object of the present invention to propose a method for visual tracking that requires only three conservative assumptions:

1. (Short-term) Constancy of Color—The color projected to the camera from a point on a surface is approximately similar in consecutive frames;
2. Spatial Motion Continuity—The optical flow in the image region corresponding to an object is spatially piecewise-continuous, that is, the optical flow of the vast majority of the pixels in this area is spatially continuous; and
3. Spatial Color Coherence—It is highly probable that adjacent pixels of similar color belong to the same object.

The first two assumptions usually hold under a sufficiently high frame rate, and the third holds for natural images.

In order to track non-rigid objects of general shape and motion without prior knowledge of their shape, the tracker of the invention uses the state space of bitmaps to classify whether each pixel in the image belongs to the target. Note that this state space is even more general than the state space of non-parametric contours, since the former may also accommodate for holes in the target. As no specific target-related scene-related or camera motion-related assumptions are made, the resulting tracker is suitable for tracking under the aforementioned very general conditions.

The tracker works by estimating in each frame the maximum a posteriori (MAP) bitmap of the target. The probability distribution function (PDF) of the target's bitmap in the current frame is conditional on the current and previous frames, as well as on the bitmap in the previous frame. A lossless decomposition of the information in the image into color information and pixel location information allows color and motion to be treated separately and systematically for the construction of the PDF.

One important advantage of the proposed tracker is that the target's bitmap PDF is marginalized over all possible motions per pixel. This is in contrast to other general-context trackers, which cling to a sole optical flow hypothesis. These trackers perform optical flow estimation—which is prone to error and is actually a harder, more general problem than the mere tracking of an object—or do not use the motion cue at all.

Another advantage of the proposed algorithm over other general-context trackers is that the target's bitmap PDF is formulated directly at the pixel level (unlike image segments). Thus, the precursory confinement of the final solution to objects composed of preliminarily-computed image segments is avoided.

The present invention thus relates to a method for visually tracking a target object silhouette in a plurality of video frames, the target object silhouette being identified by a bitmap classifying whether each pixel belongs to said target object silhouette, the method comprising the steps of:

(i) approximating a probability distribution function (PDF) assigning a probability to each possible bitmap in a given video frame; and (ii) estimating the maximum a posteriori bitmap of said target object silhouette in each video frame in order to classify whether each pixel in a given video frame belongs to said target object silhouette.

The tracker of the invention is capable of tracking a group moving together in a video, for example, tracking two or more people moving together, trackino a herd moving together etc. as long as the group is marked together (initialized) in the first frame.

In addition, the invention can be used to track more than one object on the screen by applying two or more marks on the same screen. The result will be multiple tracking of multiple objects on the same screen.

Marking the initial target object silhouette to be tracked can be achieved manually by a user using a pointing device such as a mouse or automatically by an adequate application.

The initial marking of the target object silhouette to be tracked does not need to cover precisely the entire zone of the target object silhouette. Running the tracker and tracking the target object silhouette over several video frames will substantially increase the matching of the marking with the target object silhouette. After the target object silhouette has been substantially identified, it is possible to run the video frames backwards to the initial video frame and thus return to the initial frame with the target object silhouette substantially marked.

In addition, the initial marking of the target object silhouette to be tracked may erroneously cover an area or areas outside the target object silhouette. Again, tracking the target object silhouette over several video frames will substantially remove the marking outside the target object silhouette.

BRIEF DESCRIPTION OF THE DRAWINGS

FIGS. 1A and 1B constitute a consecutive pair of images in a video of a random-dot object moving in front of a random-dot background that is moving as well. The object in the two images is shown in FIGS. 1C and 1D.

FIG. 2 shows the reduced $I_t$ and the reduced $I_{t-1}$. In practice, the bitmap is estimated in the reduced image and set to 0 outside of it.

FIG. 3 shows tracking in a random-dot video shown in 4 video frames (frames 1, 70, 130 and 200). The estimated bitmap is shown in green overlaid on top of intensity version images containing only the target.

FIGS. 4A and 4B are two (nonconsecutive) images from a video of a randomly segmented object of gradually time-varying shape, segmentation and colors, moving in front of a randomly segmented background of gradually time-varying colors that is in motion as well. The object as it appears in the two images is shown in 4C and 4D, respectively.

FIG. 5 shows tracking in a "random-segment" video (frames 1, 70, 130 and 200). The estimated bitmap is shown in green, overlaid on top of intensity version images containing only the target.

FIG. 6 shows tracking a rotating reel of cello tape filmed by a moving camera (frames 1, 17, 35 and 52). The hole in the reel, which was not revealed at the beginning of the video, was revealed and marked correctly as the video progressed.

DETAILED DESCRIPTION OF THE INVENTION

Figure 7:
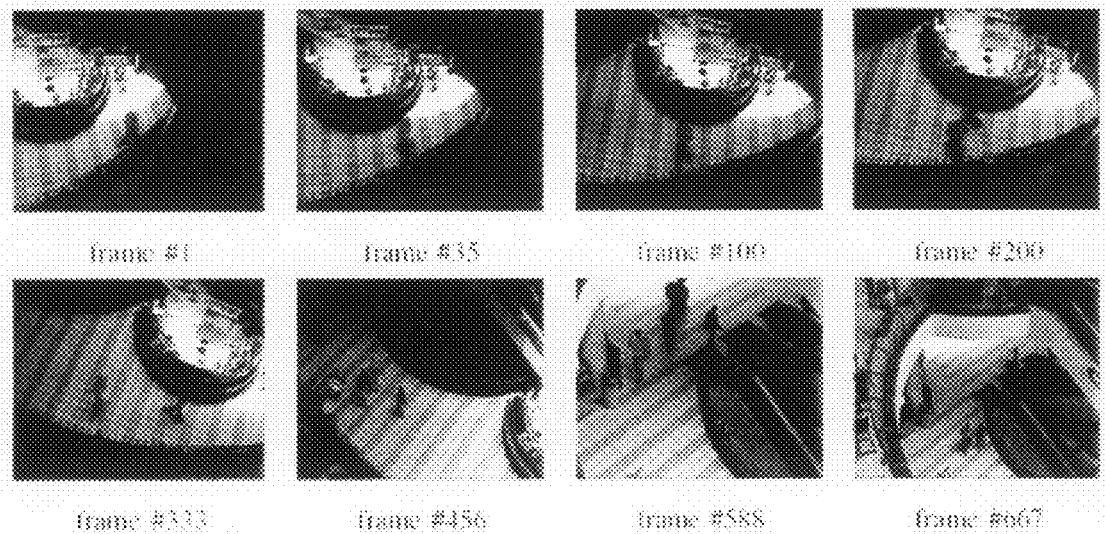
FIG. 7 shows tracking a man walking in a mall filmed by a moving camera (frames 1, 35, 100, 200, 333, 456, 588 and 667). Note that the tracker overcomes the zoom-in and zoom-out near the end of the sequence, as well as the partial occlusion at the end.

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

A. Overview

Every pixel in an image may be classified as belonging or not belonging to some particular object of interest according to the object projected to the pixel's center point. The tracker of the invention aims to classify each pixel in the movie frame whether it belongs to the target or not. Thus, the tracker's state space is binary images, i.e., bitmaps. The tracker works by estimating the target's bitmap at time t, given the movie frames at times t and t−1 and the estimate of the previous bitmap at time t−1 (t=0; 1; 2, . . . ). Thus, after being initialized by the target's bitmap in the first frame (for t=0), the tracker causally propagates the bitmap estimate in an iterative fashion. At each time t, the tracker approximates the PDF of the bitmap $X_t$.

$$P(X_t) = Pr(X_t | I_{t-1}, I_t, X_{t-1}) \quad (1)$$

($I_t$ denotes the frame at time t), and then estimates the MAP bitmap by maximizing its PDF. The estimated MAP bitmap may then be used to estimate the target's bitmap at time t+1 in the same way, and so forth. Note that the initializing bitmap $X_0$ need not be exact, as the target's bitmap may be self-corrected with time using the assumptions of spatial motion continuity and spatial color coherence, which are incorporated in (1).

When the bitmap tracking problem is formulated as in (1), the solution is targeted directly towards the sought bitmap. Thus, the commonly performed intermediate step of determining optical flow is avoided. This is an important advantage since computing optical flow is a harder, more general problem than estimating the bitmap (given the one in the previous frame).

B. The Bitmap's PDF

Modeling the bitmap's PDF (1) is very complex. In order to simplify the modeling, this PDF is factored into a product of two simpler PDFs. To this end, rather than the usual consideration of a discrete image I as a matrix of color values representing the pixel colors at the corresponding coordinates, we consider it here as a set of pixels with indices p=1, 2, . . . , |I| (|I| denotes the number of pixels in image I), each one having a particular color $c^p$ and location $l^p$ (coordinates).

The pixels are indexed arbitrarily, regardless of their location in the image. To remove any doubt, there is no connection between the indexing of the pixels in $I_t$ and the indexing in $I_{t-1}$. Specifically, if a pixel of index p in $I_t$ and a pixel of index p' in $I_{t-1}$ are such that p=p', it does not imply that the two pixels are related by their colors or locations. Taking this alternative view, a discrete image I may be decomposed into the pair I=(C, L), where $C = \{c^p\}_{p=1}^{|I|}$ and $L = \{l^p\}_{p=1}^{|I|}$. Note that no information is lost because the image may be fully reconstructed from its decomposition. This enables us to decompose $I_t$ into $I_t = (C_t, L_t) =$ $$\left( \{c_t^p\}_{p=1}^{|I_t|} \cdot \{l_t^p\}_{p=1}^{|I_t|} \right).$$

Therefore, the bitmap's PDF (1) may be written as $$P(X_t) = Pr(X_t | I_{t-1}, C_t, L_t, X_{t-1}) \quad (2)$$

Applying, Bayes' rule to (2), the bitmap's PDF may be factored into $$P(\chi_t) \propto \underbrace{Pr(\chi_t | I_{t-1}, C_t, \chi_{t-1})}_{F_1(\chi_t)} \cdot \underbrace{Pr(L_t | \chi_t, I_{t-1}, C_t, \chi_{t-1})}_{F_2(\chi_t)}. \quad (3)$$

As will be seen in what follows, these two components are easier to model due to the separation of the color information from the location information.

We denote the Boolean random variable representing the bitmap's value at pixel p in $I_t$ by $x_t^p$, which may receive one of the following values:

$$x_t^p = \begin{cases} 1 & \text{Pixel } p \text{ in } I_t \text{ belongs to the target,} \\ 0 & \text{otherwise.} \end{cases} \quad (4)$$

Note that the notation $X_t$ is the abbreviation of $$\{x_t^p\}_{p=1}^{|I_t|}.$$

1) Modeling $F_1(X_t)$: The first factor in (3), $Pr(X_t | I_{t-1}, C_t, X_{t-1})$, is the PDF of the target's bitmap in time t when considering in the $t^{th}$ frame only the pixels' colors and disregarding their coordinates. With $L_t$ not given, there is zero information on the motion from frame t−1 to frame t, and zero information on the relative position between the pixels in $I_t$. Under these circumstances, the dependency of the bitmap's bits on the pixels' colors is much stronger than the dependence between the bits themselves. That is, the decision as to whether a pixel belongs to the target can be made mainly by examining its color with respect to the colors of already classified pixels in the previous frame. Therefore, given the pixels' colors, it is reasonable to approximate the bitmap's bits as independent:

$$F_1(\chi_t) = \prod_{p=1}^{|I_t|} \frac{Pr(x_t^p \mid I_{t-1}, C_t, \chi_{t-1})}{f_1(x_t^p)}. \quad (5)$$

In practice the optical flow may be such that a pixel in $I_t$ does not exactly correspond to a single pixel in $I_{t-1}$. Yet in our model, the correspondence of a pixel p in $I_t$ is either to some pixel p' in $I_{t-1}$ (denoted by p→p') or to a surface that was not visible in time t−1 (denoted p→none.) Approximating the optical flow by integer shifts in both axes is common in visual tracking and segmentation applications (e.g., [J. Shi and J. Malik. Motion segmentation and tracking using normalized cuts. In Proceedings of the 6th IEEE International Conference on Computer Vision, pages 1154-1160, 1998].) Now, the PDF of a single bit $x_t^p$ inside the product in (5) may be marginalized over all the potential correspondences of $I_t$'s pixel p to pixels p' in $I_{t-1}$, including the event of its correspondence to none:

$$f_1(x_t^p) = \sum_{p' \in N_{t-1} \cup \{none\}} Pr(x_t^p, p \to p' \mid I_{t-1}, C_t, \chi_{t-1}), \quad (6)$$

where $N_t$ denotes the set $\{1, 2, \ldots, |I_t|\}$. Note that any hard decision about the optical flow is avoided when this marginalization is applied.

We model the color of a pixel p in $I_t$ as normally distributed with mean equal to the color of the corresponding pixel p' in $I_{t-1}$, or as uniformly distributed for pixels corresponding to none. This yields (after a detailed derivation described in Appendix I)

$$f_1(x_t^p) \propto \quad (7)$$
$$(1 - P_{none}) \cdot \sum_{p' \in N_{t-1}} Pr(x_t^p \mid p \to p', x_{t-1}^{p'}) \cdot \frac{1}{|I_{t-1}|} \cdot N_{c_{t-1}^{p'}, C}(C_t^p) +$$
$$P_{none} \cdot Pr(x_t^p \mid p \to none) \cdot U(c_t^p),$$

where $N_{\mu, C}$ is the Normal PDF of mean $\mu$ and covariance matrix C (C is set to a diagonal matrix where the variances reflect the degree of color similarity assumed by the constancy of color assumption), and U is the uniform PDF on the color space (RGB in our implementation.) $P_{none}$ is a preset constant that estimates the prior probability of having no corresponding pixel in the previous frame. ($P_{none}$ is typically set to 0.1, but as explained in Appendix I, it has only minor influence on the tracker.)

We see that $f_1(x_t^p)$ may be viewed as a mixture distribution with a component for having a corresponding pixel in the previous frame (with weight $1-P_{none}$) and a component for having no corresponding pixel (with weight $P_{none}$.)

$Pr(x_t^p \mid p \to p', x_{t-1}^{p'})$ is the probability distribution of the bitmap's bit at a pixel p, when its corresponding pixel in the previous frame, along with its estimated classification bit, are known. Since the MAP bitmap estimated for the previous frame may contain errors, we set this PDF to $$Pr(x_t^p \mid p \to p', x_{t-1}^{p'}) = \begin{cases} P_{correct} & x_t^p = x_{t-1}^{p'} \\ 1 - P_{correct} & x_t^p \neq x_{t-1}^{p'} \end{cases}, p' \in N_{t-1}, \quad (8)$$

where $P_{correct}$ is a preset constant as well, $P_{correct}$, which is typically set to 0.9, approximates the probability of the estimated bitmap being correct for a pixel.

$Pr(x_t^p \mid p \to none)$ is the prior probability distribution of the bitmap's bit at a pixel p with no corresponding pixel in the previous frame. This probability distribution is set to $$Pr(x_t^p \mid p \to none) = \begin{cases} P_{object} & x_t^p = 1 \\ 1 - P_{object} & x_t^p = 0 \end{cases}, \quad (9)$$

where $P_{object}$ is another preset constant (with a typical value of 0.4).

While the location information $L_t$ is not used at all for deriving (7) (as the conditioning is on $C_t$ only), in practice we calculate (7) with two modifications, using pixel location information in a limited way: First, instead of evaluating pixel correspondences by merely comparing the candidate pixel themselves, as is realized by the Gaussian component in (7), we compare small image patches (5 pixels in diameter) centered around the candidate pixels. This is accomplished by modifying the normal and uniform PDFs in Equation (7) to products of the color PDFs of the pixels in the patches (see Appendix I for details). This is done in order to make the pixel correspondence distributions less equivocal. Second, we restrict the maximal size of optical flow to M pixels (in our implementation M=6), and thus compare only image patches that are distanced at most by M and sum over these correspondences only (137 potential correspondences per pixel), which reduces the number of computations.

2) Modeling $F_2(X_t)$: The second factor in (3), $Pr(L_t | X_t, I_{t-1}, C_t, X_{t-1})$, is the likelihood function of the pixels' coordinates (where their colors, as well as the previous frame with its corresponding bitmap, are known). Given $I_{t-1}$ and $C_t$, PDFs of pixel correspondences between $I_t$ and $I_{t-1}$ are induced (similarly to $F_1(X_t)$). On the basis of these correspondence PDFs, $L_t$ induces PDFs of optical flow between these two frames. By the spatial motion continuity assumption, for an adjacent pair of pixels in a region belonging to a single object (where the optical flow is spatially continuous), the discrete optical flow is very likely to be the same, and for an adjacent pair of pixels belonging to different objects, the optical flow is likely to differ. Thus, the likelihood of an unequal bit-assignment to similarly-moving adjacent pixels should be much lower than an equal bit-assignment, and vice versa for differently-moving adjacent pixels. By the spatial color coherence assumption, the likelihood of an equal bit-assignment to similarly-colored adjacent pixels should be much higher than an unequal bit-assignment.

Taking this view and noting that $L_t$ determines pixel adjacency in $I_t$ and pixel motion from time t−1 to time t, we model $F_2(X_t)$ as a Gibbs distribution with respect to the first-order neighborhood system [4], $$F_2(\chi_t) \propto \prod_{\substack{unordered\ pairs \\ p_1, p_2 \in N_t\ of \\ adjacent\ pixels\ in\ I_t}} f_2(x_t^{p_1}, x_t^{p_2}), \quad (10)$$

with a potential dependent on the probabilities of the adjacencies and coordinate differences $$f_2(x_t^{p_1}, x_t^{p_2}) = \underbrace{Pr(adj(p_1, p_2) | x_t^{p_1}, x_t^{p_2}, c_t^{p_1}, c_t^{p_2})}_{f_{adj}(x_t^{p_1}, x_t^{p_2})} \cdot \tag{11}$$

$$\underbrace{Pr(\Delta_t(p_1, p_2) | adj(p_1, p_2), x_t^{p_1}, x_t^{p_2}, \mathcal{I}_{t-1}, C_t, \chi_{t-1})}_{f_\Delta(x_t^{p_1}, x_t^{p_2})}$$

where $\Delta_t(p_1, p_2) \triangleq 1_t^{p_1} - 1_t^{p_2}$ and $adj(p_1, p_2)$ is the event of pixels $p_1$ and $p_2$ being adjacent ($\|1_t^{p_1} - 1_t^{p_2}\|_2 = 1$.)

We shall begin with the first multiplicand in the right-hand side of (11). By Bayes' rule, $$f_{adj}(x_t^{p_1}, x_t^{p_2}) = \tag{12}$$

$$p(c_t^{p_1}, c_t^{p_2} | x_t^{p_1}, x_t^{p_2}, adj(p_1, p_2)) \cdot \frac{Pr(adj(p_1, p_2) | x_t^{p_1}, x_t^{p_2})}{p(c_t^{p_1}, c_t^{p_2} | x_t^{p_1}, x_t^{p_2})}.$$

We assume no prior information on the object shape and on the object/non-object color distribution. Therefore, the influence of the bitmap bits on $f_{adj}(x_t^{p_1}, x_t^{p_2})$ is dominated by the first multiplicand, and thus we approximate $$f_{adj}(x_t^{p_1}, x_t^{p_2}) \lambda p(c_t^{p_1}, c_t^{p_2}, x_t^{p_2}, adj(p_1, p_2)). \tag{13}$$

Applying the chain rule yields $$f_{adj}(x_t^{p_1}, x_t^{p_2}) \lambda p(c_t^{p_1} | x_t^{p_1}, x_1^{p_2}, adj(p_1, p_2)) \cdot p(c_t^{p_2} | c_t^{p_1}, x_t^{p_1}, x_t^{p_2}, adj(p_1, p_2)) \tag{14}$$

The first multiplicand on the right-hand side does not depend on the bitmap bits, which leaves only the second multiplicand, which we model as $$f_{adj}(x_t^{p_1}, x_t^{p_2}) \propto \begin{cases} U(c_t^{p_2}) + N_{c_t^{p_1}, C_{adj}}(c_t^{p_2}) & x_t^{p_1} = x_t^{p_2} \\ U(c_t^{p_2}) & x_t^{p_1} \neq x_t^{p_2}. \end{cases} \tag{15}$$

This corresponds to modeling the colors of adjacent pixels as uniformly and independently distributed in the case that they belong to different objects. If these pixels belong to the same object, their color distribution is a mixture of a uniform distribution (corresponding to the case of belonging to different color segments) and a Gaussian in their color difference (corresponding to the case of belonging to the same segment of homogeneous color). $C_{adj}$ is assigned very small variances, reflecting the variance of the color differences between adjacent pixels belonging to a surface of homogeneous color. (In our implementation it was set to 0.01 for each RGB color channel, where the range of each color is [0,1].) We see that for differently-colored adjacent pixels the likelihood is approximately similar for equal and unequal bit-assignments, and for similarly-colored adjacent pixels the likelihood is much higher for equal bit-assignments, which is in keeping with the spatial color coherence assumption. Equation (15) may be used to compute the four likelihoods $\{f_{adj}(x_t^{p_1} = b_1, x_t^{p_2} = b_2)\}_{b_1, b_2 \in \{0,1\}}$ (up to a scaling, which is unimportant).

We turn now to the second multiplicand on the right-hand side of (11), $f_\Delta(x_t^{p_1}, x_t^{p_2})$. After a detailed derivation, which will be given in Appendix II, $$f_\Delta(x_t^{p_1}, x_t^{p_2}) = \tag{16}$$

$$\begin{cases} P_{flow_1} \cdot S_1(x_t^{p_1}, x_t^{p_2}; p_1, p_2) + (1 - P_{flow_1}) \cdot \\ S_2(x_t^{p_1}, x_t^{p_2}; p_1, p_2) + 0.25 \cdot S_3(x_t^{p_1}, x_t^{p_2}; p_1, p_2). & x_t^{p_1} = x_t^{p_2}, \\ (1 - P_{flow_2}) \cdot S_1(x_t^{p_1}, x_t^{p_2}; p_1, p_2) + P_{flow_2} \cdot \\ S_2(x_t^{p_1}, x_t^{p_2}; p_1, p_2) + 0.25 \cdot S_3(x_t^{p_1}, x_t^{p_2}; p_1, p_2), & x_t^{p_1} \neq x_t^{p_2}, \end{cases}$$

where $S_1(x_t^{p_1}, x_t^{p_2}, p_1, p_2)$ is the probability that $I_t$'s pixels $p_1$ and $p_2$ have identical discrete optical flows, $S_2(x_t^{p_1}, x_t^{p_2}; p_1, p_2)$ is the probability that they have different discrete optical flows, and $S_3(x_t^{p_1}, x_t^{p_2}; p_1, p_2)$ is the probability that at least one of the two pixels has no corresponding pixel in the previous frame (and thus has no optical flows.) All these probabilities are conditional on: 1) the two pixels' classification bits; 2) $C_t$; and 3) the previous frame along with its estimated bitmap. (See Appendix II for the method used to estimate these probabilities.) $P_{flow_1}$ is a predefined constant approximating the probability that two equally classified, adjacent pixels have similar discrete optical flows (given that the corresponding pixels exist.) $P_{flow_2}$ is another predefined constant approximating the probability that two unequally classified, adjacent pixels have different discrete optical flows. Both constants have a typical value of 0.99.

Examining (16), we see that the higher the probability of identical discrete optical flows, the higher the likelihood for $x_t^{p_1} = x_t^{p_2}$, and vice versa for the probability of different discrete optical flows, conforming to the spatial motion continuity assumption. When at least one of the pixels has no corresponding pixel in the previous frame, there is no preference for any bit assignments, since the optical flow is undefined.

3) The Final Bitmap PDF: The multiplicands in (5) and in (10) may be written as $$f_1(x_t^p) = c_1(p, t) x_t^p + c_2(p, t).$$

$$f_2(x_t^{p_1}, x_t^{p_2}) = c_3(p_1, p_2, t) x_t^{p_1} x_t^{p_2} + c_4(p_1, p_2, t) x_t^{p_1} + c_5(p_1, p_2, t) x_t^{p_2} + c_6(p_1, p_2, t), \tag{17}$$

where $$c_1(p, t) = f_1(x_t^p = 1) - f_1(x_t^p = 0),$$

$$c_2(p, t) = f_1(x_t^p = 0),$$

$$c_3(p_1, p_2, t) = f_2(x_t^{p_1} = 1, x_t^{p_2} = 1) - f_2(x_t^{p_1} = 1, x_t^{p_2} = 0) - f_2(x_t^{p_1} = 0, x_t^{p_2} = 1) + f_2(x_t^{p_1} = 0, x_t^{p_2} = 0) \tag{18}$$

$$c_4(p_1, p_2, t) = f_2(x_t^{p_1} = 1, x_t^{p_2} = 0) - f_2(x_t^{p_1} = 0, x_t^{p_2} = 0)$$

$$c_5(p_1, p_2, t) = f_2(x_t^{p_1} = 0, x_t^{p_2} = 1) - f_2(x_t^{p_1} = 0, x_t^{p_2} = 0)$$

$$c_6(p_1, p_2, t) = f_2(x_t^{p_1} = 0, x_t^{p_2} = 0).$$

Substituting (17) into (5) and (10), the bitmap's PDF (3) is finally $$P(\chi_t) \propto \tag{19}$$

$$\prod_{p=1}^{|I_t|} [c_1(p, t) x_t^p + c_2(p, t)] \cdot \prod_{\substack{\text{unordered pairs} \\ p_1, p_2 \in N_t \text{ of} \\ \text{adjacent pixels in } I_t}} [c_3(p_1, p_2, t) x_t^{p_1} x_t^{p_2} +$$

$$c_4(p_1, p_2, t) x_t^{p_1} + c_5(p_1, p_2, t) x_t^{p_2} + c_6(p_1, p_2, t)].$$

C. MAP Bitmap Estimation

In order to estimate the MAP bitmap $X_t^{MAP}$, (19) should be maximized:

$$\chi_t^{MAP} = \arg\max_{\chi_t} P(\chi_t). \tag{20}$$

Since the logarithm is a monotonically increasing function, $$\begin{aligned}\chi_t^{MAP} &= \arg\max_{\chi_t} \ln(P(\chi_t)) \\ &= \arg\max_{\chi_t} \sum_{p=1}^{|I_t|} \ln(c_1(p,t)x_t^p + c_2(p,t)) + \\ &\quad \prod_{\substack{\text{unordered pairs} \\ p_1,p_2 \in N_t \text{ of} \\ \text{adjacent pixels in } I_t}} \ln(c_3(p_1,p_2,t)x_t^{p_1}x_t^{p_2} + \\ &\quad c_4(p_1,p_2,t)x_t^{p_1} + c_5(p_1,p_2,t)x_t^{p_2} + c_6(p_1,p_2,t)).\end{aligned} \tag{21}$$

Due to the fact that the variables in the objective function are 0-1, $$\begin{aligned}\chi_t^{MAP} &= \arg\max_{\chi_t} \sum_{p=1}^{|I_t|} \left[\ln\left(\frac{c_1(p,t)+c_2(p,t)}{c_2(p,t)}\right)x_t^p + \ln c_2(p,t) + \right. \\ &\quad \prod_{\substack{\text{unordered pairs} \\ p_1,p_2 \in N_t \text{ of} \\ \text{adjacent pixels in } I_t}} \left[\ln\left(\frac{\substack{(c_3(p_1,p_2,t)+c_4(p_1,p_2,t)+c_5(p_1,p_2,t)+\\ c_6(p_1,p_2,t))c_6(p_1,p_2,t)}}{(c_4(p_1,p_2,t)+c_6(p_1,p_2,t))(c_5(p_1,p_2,t)+c_6(p_1,p_2,t))}\right)\right. \\ &\quad x_t^{p_1}x_t^{p_2} + \ln\left(\frac{c_4(p_1,p_2,t)+c_6(p_1,p_2,t)}{c_6(p_1,p_2,t)}\right)x_t^{p_1} + \ln \\ &\quad \left.\left(\frac{c_5(p_1,p_2,t)+c_6(p_1,p_2,t)}{c_6(p_1,p_2,t)}\right)x_t^{p_2} + \ln c_6(p_1,p_2,t)\right] \\ &= \arg\max_{\chi_t} \prod_{\substack{\text{unordered pairs} \\ p_1,p_2 \in N_t \text{ of} \\ \text{adjacent pixels in } I_t}} \left[\ln\left(\frac{f_2(x_t^{p_1}=1, x_t^{p_2}=1)\cdot f_2(x_t^{p_1}=0, x_t^{p_2}=0)}{f_2(x_t^{p_1}=1, x_t^{p_2}=0)\cdot f_2(x_t^{p_1}=0, x_t^{p_2}=1)}\right)\right. \\ &\quad x_t^{p_1}x_t^{p_2} + \ln\left(\frac{f_2(x_t^{p_1}=1, x_t^{p_2}=0)}{f_2(x_t^{p_1}=0, x_t^{p_2}=0)}\right)x_t^{p_1} + \ln\left(\frac{f_2(x_t^{p_1}=0, x_t^{p_2}=1)}{f_2(x_t^{p_1}=0, x_t^{p_2}=0)}\right)x_t^{p_2}\right] + \\ &\quad \sum_{p=1}^{|I_t|} \ln\left(\frac{f_1(x_t^p=1)}{f_1(x_t^p=0)}\right)x_t^p.\end{aligned} \tag{22}$$

After gathering common terms in the resulting polynomial, we obtain $$\chi_t^{MAP} = \arg\max_{\chi_t} \prod_{\substack{\text{unordered pairs} \\ p_1,p_2 \in N_t \text{ of} \\ \text{adjacent pixels in } I_t}} \tilde{c}_1(p_1,p_2,t)x_t^{p_1}x_t^{p_2} + \sum_{p=1}^{|I_t|} \tilde{c}_2(p,t)x_t^p. \tag{23}$$

Unfortunately, maximizing quadratic pseudo-Boolean functions is NP-hard [E. Boros and P. L. Hammer. Pseudo-Boolean optimization. Discrete Applied Mathematics, 123: 155-225, 2002]. Although the objective function in (23) is not a general quadratic because all its quadratic terms are composed of bits corresponding to adjacent pixels, we know of no method that has been devised to efficiently find the global maximum of such functions. Thus, instead of maximizing the objective function in (23), we choose to replace each quadratic term $\tilde{c}_1(p_1,p_2,t)x_t^{p_1}x_t^{p_2}$ with a negative coefficient by the term $$\frac{\tilde{c}_1(p_1,p_2,t)}{2}x_t^{p_1} + \frac{\tilde{c}_1(p_1,p_2,t)}{2}x_t^{p_2}.$$

This discriminates against the two assignments $x_t^{p_1} \neq x_t^{p_2}$ by $$\frac{\tilde{c}_1(p_1,p_2,t)}{2},$$

but does not alter the objective function's value for the assignments $x_t^{p_1}=x_t^{p_2}=0$ and $x_t^{p_1}=x_t^{p_2}=1$. The resulting objective function has only nonnegative coefficients for the quadratic terms, and therefore its maximization may be reduced into a maximum-flow problem [5]. We specifically chose this method to estimate the maximum of (23) because it discriminates only against unequal bit assignments to adjacent pixel pairs, which typically constitute only a small portion of the bitmap (the object contour.)

Occasionally the estimated MAP bitmap may contain extraneous small connected components. This may happen after a small patch is erroneously attached to the target (due to very similar color or motion) and then disconnected from it as a set of non-target pixels separating the target from this patch is correctly classified. (In another scenario, the target may actually split into more than one connected component. Note that the bitmap's PDF does not assume any a priori topological information.) In this case, only the largest connected component in the estimated bitmap is maintained.

D. Considering only Target-potential Pixels

Since the optical flow between adjacent frames is assumed to be limited by a maximal size M, there is no need to solve (23) for all the pixels in $I_t$. Instead, it is enough to solve only for the set of pixels with locations similar to the ones constituting the target in $I_{t-1}$, dilated with a disc of radius equal to M pixels, and set the bitmap to zero for all other pixels. In other words, $I_t$ is reduced to contain only the pixels that might belong to the target (see the left-hand diagram of FIG. 2). The set of pixels in $I_{t-1}$ that may correspond to the pixels in the reduced $I_t$ contains the set of pixels with locations similar to the ones in the reduced $I_t$, dilated with the aforementioned disc. That is, the reduced $I_{t-1}$ constitutes the target in $I_{t-1}$, dilated twice with the aforementioned disc (see the right-hand diagram of FIG. 2). Note that the reduced $I_{t-1}$ is larger than the reduced $I_t$, because the latter may include non-target pixels whose corresponding pixels in $I_{t-1}$ are of locations outside the reduced $I_t$. Note that changing the pixel-sets $I_t$ and $I_{t-1}$ to the corresponding reduced versions affects some normalization constants in the formulae.

E. Algorithm Outline

A summary of the algorithm of the invention is given in the outline below. Note that some parts of the algorithm refer to equations given in the appendices. This was done for the sake of readability.

---

Input: $I_t, I_{t-1}, X_{t-1}$.
Output: $X_t$.

1) $I_t$ – reduced$I_t$; $I_{t-1}$ – reduced$I_{t-1}$.
2) For all pixels $p \in I_t$ compute the optical flow distribution $f_1^{-1}(p'; p, t)$ using (28), as well as the two optical flow distributions $f^1{}_{\Delta marginal}$ $(p', x_{pt}; p)$ conditional on $x^p{}_t = 0$ and $x^p{}_t = 1$ usine (43).
3) For each pixel $p \in I_t$ compute $f_1$ ($x^p{}_t = 1$) and ($x^p{}_t = 0$) using (31) and (32), respectively.
4) For each pair of adjacent pixels (4-neighborhood) $p_1, p_2 \in I_t$:
a) Compute $f_{adj}$ ($x^{p1}{}_t, x^{p2}{}_t$) for the four possible bit-assignments using (15).
b) Compute $S_3$ ($x^{p1}{}_t, x^{p2}{}_t; p_1, p_2$) for the four possible bit-assignments using (45).
c) Calculate the bounds on $S_1$ ($x^{p1}{}_t, x^{p2}{}_t; p_1, p_2$) for the four possible bit-assignments using (47).
d) Obtain the four intervals of $f_\Delta$ ($x^{p1}{}_t, x^{p2}{}_t$) by substituting $S_2$ ($x^{p1}{}_t, x^{p2}{}_t; p_1, p_2$) in (16) by the right-hand side of (48) and using the results from steps (b) and (c).
e) Set the four values of $f_\Delta$ ($x^{p1}{}_t, x^{p2}{}_t$) within the corresponding intervals obtained in (d) using Algorithm MINIMIZE.
f) Compute $f_2$ ($x^{p1}{}_t, x^{p2}{}_t$) for the four different bit-assignments by substituting the results from steps (a) and (e) in (11).
5) Obtain the objective function in the right-hand side of (22) using the result from steps 3 and 4(f). transform into canonical form (23). and replace each quadratic term
$\hat{c}_1$ ($p_1, p_2, t)x^{p1}{}_t x^{p2}{}_t$ with a negative coefficient by the term $$\frac{\partial_1(p_1, p_2, t)}{2}X_t^{p_1} + \frac{\partial_1(p_1, p_2, t)}{2}X_t^{p_2}.$$

6) Find the bitmap $X^{MAP}{}_t$ maximizing the objective function obtained in previous step as explained in III-C.
7) $X_t \leftarrow X^{MAP}{}_t$ zero-padded into image size.

---

Experiments

The system of the invention was tested on several image sequences, the first two synthesized and the rest natural. All the experiments demonstrate the successful tracking of rigid and non-rigid targets moving in 3D scenes and filmed by an arbitrarily moving camera. As no prior knowledge is assumed regarding the scene or target, and the target's shape and appearance undergo heavy changes over time (due to deformations, changes in viewing direction or lighting, or partial occlusions), a tracker of a more restricted context such as [P. P'erez, C. Hue, J. Vermaak, and M. Gangnet. Color-based probabilistic tracking. In Proceedings of the 7th European Conference on Computer Vision, pages 661-675, 2002] would not be suitable here.

As the tracker was implemented in MATLAB® (by Mathworks of Natick, Mass.), the execution was rather slow. On a personal computer with a Pentium® IV 3 GHz processor, the per-frame execution time was a few seconds.

In all experiments, the parameters were set to the values indicated before, and the tracking was manually initialized in the first frame. Although all the image sequences are colored, they are shown here as intensity images so that the estimated bitmaps, overlaid on top in green, will be clear. Video files of all the presented tracking results are given as supplementary material.

1) Random-dot Sequence: First we tested the tracker of the invention on a random-dot object of gradually time-varying shape and colors moving in front of a random-dot background of gradually time-varying colors that is in motion as well. See FIG. 1 for the first two frames ((a)-(b)) and the object in each of them ((c)-(d)). FIG. 3 shows, for a number of frames, the estimated bitmap in green, overlaid on top of intensity version images containing only the target. The background was cut from these images to enable the comparison of the estimated bitmap with respect to the target. It is evident that the tracking in this sequence is very accurate. Note that new object pixels and revealed background pixels are correctly classified, due to the spatial motion continuity assumption.

2) Random-segment Sequence: Since the random-dot video contains a lot of texture, the optical flow may be estimated with high precision. To test the tracker of the invention on a less textured video, we used a randomly segmented object of gradually time-varying shape, segmentation and colors, moving in front of a randomly segmented background of gradually time-varying colors that is in motion as well. See FIG. 4 for two sample images and the object as it appears in them. Tracking results are given in FIG. 5, where the estimated bitmaps are shown in green, overlaid on top of intensity version images containing only the target. As in the random-dot experiment, the tracking here is accurate too. Note that new object segments and revealed background segments are correctly classified, due to the spatial motion continuity and the spatial color coherence assumptions.

3) Cello tape Sequence: Here we tracked a rotating and moving reel of cello tape filmed by a moving camera. A few frames with the corresponding tracking results are shown in FIG. 6. The hole in the reel, which was not revealed at the beginning of the video, was revealed and marked correctly as the video progressed. Note that this change in object topology could not have been coped with using a state space of object enclosing contours.

4) Man-in-Mall Sequence: In this experiment we tracked a man walking in a mall, filmed by a moving camera. A few frames with the tracking results overlaid are shown in FIG. 7. Although parts of the target are occasionally misclassified, these are corrected with time due to the spatial motion continuity and the spatial color coherence assumptions. Note the zoom-in and zoom-out near the end of the sequence, and the partial occlusion at the end.

Figure 8:
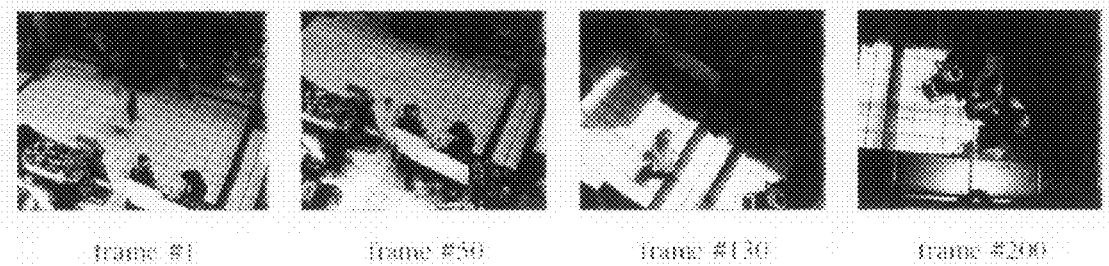
FIG. 8 shows tracking a woman walking in a mall as filmed by a moving camera (frames 1, 50, 130 and 200). The tracking algorithm overcame lighting changes and long-term partial occlusions. Since the woman and the girl she takes by hand were adjacent and walking at similar velocity over an extended time period (beginning around frame #100), the girl and the woman were joined as the tracking proceeded.

5) Woman-and-Child Sequence: Here the tracker of the invention was tested on a sequence of a woman walking in a mall, filmed by a moving camera. See FIG. 8 for a few frames and the corresponding tracking results. Note that the tracking overcame lighting changes and long-term partial occlusions. Since the woman and the girl she takes by the hand were adjacent and walking at similar velocity over an extended time period (beginning around frame #100), the girl was joined to the woman in the tracking process.

Figure 9:
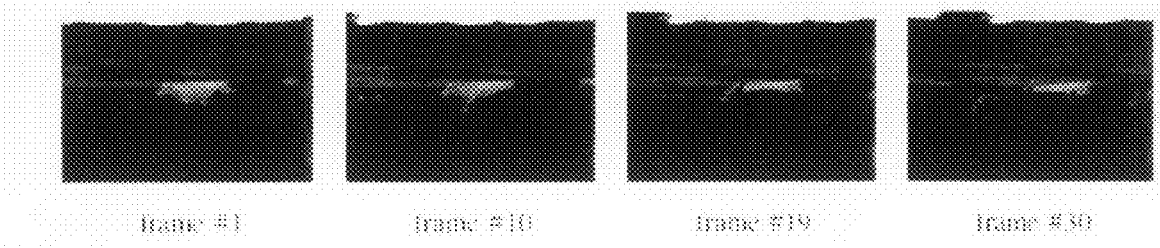
FIG. 9 shows tracking a cow in a running herd filmed by a moving camera (frames 1, 10, 19 and 30). Although the tracked object underwent a-severe partial occlusion, the tracking continued.

6) Herd Sequence: In this experiment the tracker of the invention was tested on one cow running in a herd filmed by a moving camera. A few frames with the tracking results overlaid are shown in FIG. 9. Note that the tracking overcame a severe partial occlusion.

Figure 10:
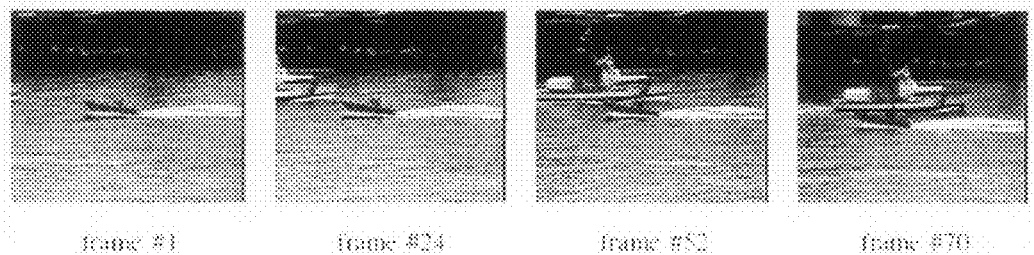
FIG. 10 shows tracking a floating boat filmed by a moving camera (frames 1, 24, 52 and 70). The background is moving because of both the motion of the camera and the motion of the water.

7) Boat Sequence: Here we tracked a floating boat, filmed by a moving camera. A few frames with the corresponding tracking results are presented in FIG. 10. Note that in this sequence the background motion is caused not only by the camera motion, but also by the motion of the water.

Figure 11:
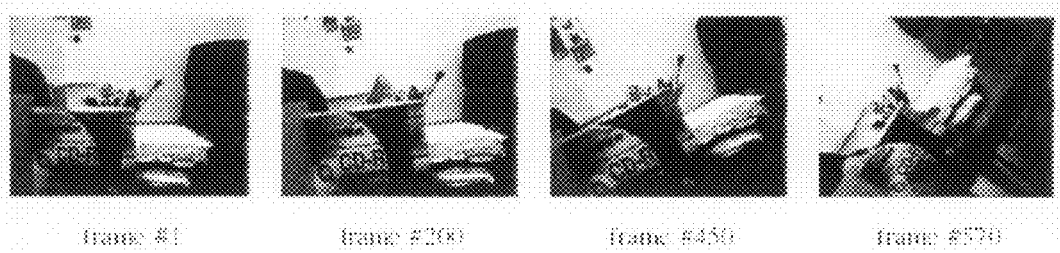
FIG. 11 shows tracking a lighter undergoing general motion and severe partial occlusions as filmed by a moving camera (frames 1, 200, 450 and 570).

8) Lighter Sequence: In this sequence we tracked a lighter undergoing general motion, filmed by a moving camera. FIG. 11 shows a few frames along with the tracking results. Note that the areas of the lighter that were previously occluded by other objects or by the lighter itself are correctly classified upon exposure.

Figure 12:
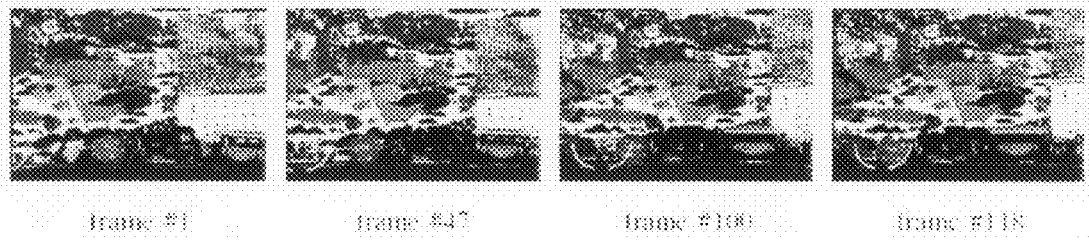
FIG. 12 shows tracking a rolling ball filmed by a moving camera. Note the occlusion caused by the toy (frames 1, 47, 100 and 118).

9) Ball Sequence: Here we tracked a ball, initially rolling in front of the moving camera, but then partially occluded by a toy. Results are shown in FIG. 12. Note the correct classification of areas of the ball that appear during its roll behind the toy.

CONCLUSION

A novel algorithm for visual tracking under very general conditions was developed. The algorithm handles non-rigid targets, whose appearance and shape in the image may change drastically, as well as general camera motion and 3D scenes. The tracking is conducted without any a priori target-related or scene-related information (except the target's bitmap in the first frame, given for initialization.) The tracker works by maximizing in each frame a PDF of the target's bitmap formulated at pixel level through a lossless decomposition of the image information into color information and pixel-location information. This image decomposition allows color and motion to be treated separately and systematically. The tracker relies on only three conservative assumptions: approximate constancy of color in consecutive frames (short-term constancy of color assumption), spatial piecewise-continuity in the optical flow of pixels belonging to the same object (spatial motion continuity assumption), and the belonging of similarly-colored adjacent pixels to the same object (spatial color coherence assumption).

Rather than estimating optical flow by means of a point estimate, we construct the bitmap's PDF by marginalizing over all possible pixel motions. This is an important advantage, as optical flow estimation is prone to error, and is actually a harder and more general problem than target tracking. A further advantage is that the target's bitmap PDF is formulated directly at pixel level. Thus, the precursory confinement of the final solution to objects composed of preliminarily-computed image segments, as is common in video segmentation algorithms, is avoided. Experimental results demonstrate the tracker's robustness to general camera motion and major changes in object appearance caused by variations in pose, configuration and lighting, or by long-term partial occlusions.

APPENDIX I

Derivation of $f_1(x_t^p)$

Continuing from Equation (6) by using the chain rule yields $$f_1(x_t^p) \sum_{p' \in N_{t-1} \cup \{none\}} \frac{Pr(p \to p' \mid \mathcal{I}_{t-1}, C_t, \chi_{t-1})}{f_1^1(p';p,t)} \cdot \quad (24)$$

$$\frac{Pr(x_t^p \mid p \to p', \mathcal{I}_{t-1}, C_t, \chi_{t-1})}{f_1^2(x_t^p;p')}$$

The first multiplicand inside the sum of (24) is the probability that $I_t$'s pixel p corresponds to pixel p' in $I_{t-1}$ (or the probability that it corresponds to none) when considering only the pixel colors in $I_t$ and disregarding their exact placement in the frame. Using Bayes' rule, we have $$f_1^1(p';p,t) \times Pr(p-p' \mid I_{t-1}, \lambda_{t-1}) \cdot p(C_t \mid p-p', I_{t-1}, X_{-1}). \quad (25)$$

Since $L_t$ is not given, the prior on the potentially corresponding pixels $p' \in N_{t-1}$ is uniform, and we set the prior probability of having no corresponding pixel in the previous frame to $P_{none}$. Subject to this and under the constancy of color assumption, for $p' \in N_{t-1}$ we approximate the first multiplicand inside the sum of (24) as $$f_1^1(p'; p, t) \propto \frac{1 - P_{none}}{|\mathcal{I}_{t-1}|} \cdot N_{c_{t-1}^{p'} \cdot C}(C_t^p), \quad (26)$$

$$p' \in N_{t-1},$$

where $N_{\mu,C}$ is the normal PDF of mean μ and covariance matrix C that is set as a constant as well. (C is set to a diagonal matrix, where the variances reflect the degree of color similarity assumed in the constancy of color assumption.) For p'=none we approximate $$f_1^1(none;p,t) \propto P_{none} \cdot U(c_t^p), \quad (27)$$

where U is the uniform PDF on the color-space (RGB in our implementation.) Note that the tracker's sensitivity to $P_{none}$ is minor, because of the very highly-peaked nature of $f_1^1(p';p,t)$ (as a function of p') that is due to the multidimensional Gaussian modeling in (26). In our implementation $P_{none}$ was set to 0.1.

In practice, in order to estimate the pixel correspondences more exactly, we compare small image patches (5 pixels in diameter) centered around the candidate pixels instead of merely comparing the candidate pixels themselves. This change is made by modifying the normal and uniform PDFs in Equations (26) and (27), respectively, to products of the color PDFs of the pixels in the patches. In addition, since pixels that are projections of different objects are likely to have different optical flows despite their adjacency in the image plane, we avoid comparing an image patch in $I_t$ to an image patch in $I_{t-1}$ that contains a mix of pixels p' assigned $x_{t-1}^{p'}=1$ and $x_{t-1}^{p'}=0$. In such cases, we compare only the pixels in the patch that are assigned the same bitmap value as is assigned to the center pixel, which is the one the correspondence is sought for. We also restrict the maximal size of optical flow to M pixels (in our implementation M=6), and compare only image patches distanced at most by M, which reduces the number of computations. Thus, the sum in (24) is computed over a subset of feasible pixels in $I_{t-1}$ (137 pixels for M=6) and none, which reduces computation time. We conclude for the first multiplicand inside the sum of (24):

$$f_1^1(p'; p, t) \propto \begin{cases} \frac{1-P_{none}}{|\mathcal{I}_{t-1}|} \cdot N_{\bar{c}_{t-1}^{p'}, C}(\bar{c}_t^p) & p' \in \mathcal{D}_{t-1}(p), \\ P_{none} \cdot U(\bar{c}_t^p) & p' = \text{none}, \end{cases} \quad (28)$$

where $D_{t-1}(p) \triangleq \{p': \|l_{t-1}^{p'} - l_t^p\|_2 \leq M\}$ is the index-set of pixels in $I_{t-1}$ within a radius of M pixels from pixel p, and $c_t^{-p}$ is the vector of colors of every pixel composing the image patch for pixel p in $I_t$, say in raster order. Since all the feasible cases for p' are covered by $D_{t-1}(p) \cup \{\text{none}\}$, normalizing to a unit sum over $p' \in D_{t-1}(p) \cup \{\text{none}\}$ produces the correct probabilities (although normalizing here is not necessary, as it will only scale $P(X_t)$, which does not change its maximizing bitmap).

The second multiplicand inside the sum of (24) is the PDF of the bitmap's value at pixel p in $I_t$, conditional on this pixel's correspondence to pixel p' in $I_{t-1}$, whose bitmap value is given. Since the MAP bitmap estimated for the previous frame may contain errors, we set this PDF to $$f_1^2(x_t^p : p') = \begin{cases} P_{correct} & x_t^p = x_{t-1}^{p'} \\ 1 - P_{correct} & x_t^p \neq x_{t-1}^{p'} \end{cases} \cdot p' \in N_{t-1}, \quad (29)$$

where $P_{correct}$ is a preset constant approximating the probability of the estimated bitmap being correct for a pixel. ($P_{correct}$ is typically set to 0.9.) For p'=none we set this PDF to $$f_1^2(x_t^p : \text{none}) = \begin{cases} P_{object} & x_t^p = 1 \\ 1 - P_{object} & x_t^p = 0 \end{cases} \quad (30)$$

where $P_{object}$ is also a preset constant that approximates the probability of a pixel, with no corresponding pixel in the previous frame, to belong to the target. ($P_{object}$ is typically set to 0.4.)

To conclude the steps for computing $f_1(x_t^p)$ for pixel p in $I_t$, we first use Equation (28) to compute the probabilities $f_1^1(p'; p,t)$ for $p' \in D_{t-1}(p) \cup \{\text{none}\}$, that is, the probabilities for pixel p's different correspondences to pixels in $I_{t-1}$ (feasible subject to the maximal optical flow assumed), including the probability of having no corresponding pixel. Then, by substituting Equations (29) and (30) into Equation (24), we derive $$f_1(x_t^p = 1) = P_{correct} \cdot \sum_{p' \in \mathcal{D}_{t-1}(p) \cap \{q:x_{t-1}^q=1\}} f_1^1(p'; p, t) + \quad (31)$$
$$(1 - P_{correct}) \cdot \sum_{p' \in \mathcal{D}_{t-1}(p) \cap \{q:x_{t-1}^q=0\}} f_1^1(p'; p, t) +$$
$$P_{object} \cdot f_1^1(\text{none}: p, t),$$

and by complementing, $$f_1(x_t^p 0) = 1 - f_1(x_t^p = 1). \quad (32)$$

We remark that there are many computations in (28) that are common for overlapping image patches, which may be taken advantage of in order to reduce computation time. More specifically, consider one patch-pair in $I_t$ and $I_{t-1}$, and a second patch-pair shifted by one pixel, say to the right. Then except for the Gaussian factors for the pixel-pairs in the right-most column in the second patch-pair, the Gaussian factors for all pixel-pairs in this patch-pair are identical to the Gaussian factors for pixel-pairs in the first patch-pair (assuming that neither patch in $I_{t-1}$ contains mixed bit-assignments.)

APPENDIX II

Derivation of $f_\Delta(x_t^{p_1}, x_t^{p_2})$

In the following we shall derive and show how we compute $f_\Delta(x_t^{p_1}, x_t^{p_2})$, which equals $\Pr(\Delta_t(p_1,p_2)|adj(p_1,p_2), x_t^{p_1}, x_t^{p_2}, I_{t-1}, C_t, X_{t-1})$ where $\Delta_t(p_1,p_2) \triangleq l_t^{p_1} - l_t^{p_2}$ and $adj(p_1,p_2)$ is the event of pixels $p_1$ and $p_2$ being adjacent. This expression is the right-hand side multiplicand in (11).

Marginalizing $f_\Delta(x_t^{p_1}, x_t^{p_2})$ over all the potential correspondences of pixels $p_1$ and $p_2$ to pixels in $I_{t-1}$, including the event of corresponding to none, and then applying the chain rule, yields $$f_\Delta(x_t^{p_1}, x_t^{p_2}) = \sum_{p_1', p_2' \in N_{t-1} \cup \{none\}} \frac{\Pr(p_1 - p_1', p_2 - p_2' | adj(p_1,p_2), x_t^{p_1}, x_t^{p_2}, \mathcal{I}_{t-1}, C_t \cdot \chi_{t-1})}{f_\Delta^1(p_1', p_2', x_t^{p_1}, x_t^{p_2}; p_1, p_2)} \quad (33)$$

$$\frac{\Pr(\Delta_t(p_1, p_2) | adj(p_1,p_2), p_1 - p_1', p_2 - p_2', x_t^{p_1}, x_t^{p_2}, \mathcal{I}_{t-1}, C_t \cdot \chi_{t-1})}{f_\Delta^2(x_t^{p_1}, x_t^{p_2}; \Delta_t(p_1,p_2), p_1', p_2')}$$

The second multiplicand inside the sum of (33) is the likelihood of the relative position between adjacent pixels $p_1$ and $p_2$ in $I_t$, where the coordinates of their corresponding pixels in $I_{t-1}$, if any, are known (because the likelihood is conditional on the pixel correspondences and on $I_{t-1}$, which consists of $L_{t-1}$). In accordance with the spatial motion continuity assumption, we approximate this likelihood as is summarized in Table I. When $x_t^{p_1} = x_t^{p_2}$ and both pixels have corresponding pixels in $I_{t-1}$, it is very likely that $\Delta_t(p_1,p_2) = \Delta_{t-1}(p_1',p_2')$. The probability of this event is assigned $P_{flow1}$, which is a preset constant of typical value 0.99. The complementary event of $\Delta_t(p_1,p_2) \neq \Delta_{t-1}(p_1',p_2')$ is thus assigned $1-P_{flow1}$. Equivalently, when $x_t^{p_1} \neq x_t^{p_2}$ and both pixels have corresponding pixels in $I_{t-1}$, it is very likely that $\Delta_t(p_1,p_2) \neq \Delta_{t-1}(p_1',p_2')$. The probability of this event is assigned $P_{flow2}$ which is a preset constant as well, with a, typical value of 0.99. Complementing again yields that the event of $\Delta_t(p_1,p_2) = \Delta_{t-1}(p_1',p_2')$ is $1-p_{flow2}$. When one or both of the pixels have no corresponding pixel in $I_{t-1}$ the spatial motion continuity assumption is irrelevant and the four different values for $\Delta_t(p_1,p_2)$ are assigned the same probability of 0.25.

TABLE I

The Values of $f_\Delta^2(x_t^{p_1}, x_t^{p_2}; \Delta_t(p_1,p_2), p_1', p_2')$

| | | $p'_1, p'_2 \in N_{t-1}$ | |
|---|---|---|---|
| | $p'_1$ = none or $p'_2$ = none | $\Delta_{t-1}(p'_1, p'_2) = \Delta_t(p_1, p_2)$ | $\Delta_{t-1}(p'_1, p'_2) \neq \Delta_t(p_1, p_2)$ |
| $x_t^{p_1} = x_t^{p_2}$ | 0.25 | $P_{flow1}$ | $1 - P_{flow1}$ |
| $x_t^{p_1} \neq x_t^{p_2}$ | 0.25 | $1 - P_{flow2}$ | $P_{flow2}$ |

Following the partitioning of the possibilities for $p_1'$ and $p_2'$ summarized in Table I, the sum in (33) may be split into three cases:

$$\{(p_1',p_2') \in N_{t-1}^2 | \Delta_{t-1}(p_1',p_2') = \Delta_t(p_1,p_2)\},$$

$$\{(p_1',p_2') \in N_{t-1}^2 | \Delta_{t-1}(p_1',p_2') \neq \Delta_t(p_1,p_2)\} \text{ and}$$

$$\{(p_1',p_2') \in (N_{t-1} \cup \{none\})^2 | p_1' = \text{none or } p_2' = \text{none}\}. \text{ For } x_t^{p_1} = x_t^{p_2} \text{ Equation (33) becomes}$$

$$f_\Delta(x_t^{p_1} \cdot x_t^{p_2}) = \tag{34}$$

$$P_{flow_1} \cdot \underbrace{\sum_{\substack{p_1', p_2' \in N_{t-1} \text{ such that} \\ \Delta_{t-1}(p_1',p_2') = \Delta_t(p_1,p_2)}} f_\Delta^1(p_1', p_2', x_t^{p_1}, x_t^{p_2}; p_1, p_2)}_{S_1(x_t^{p_1}, x_t^{p_2}; p_1, p_2)} +$$

$$(1 - P_{flow_1}) \cdot$$

$$\underbrace{\sum_{\substack{p_1', p_2' \in N_{t-1} \text{ such that} \\ \Delta_{t-1}(p_1',p_2') \neq \Delta_t(p_1,p_2)}} f_\Delta^1(p_1', p_2', x_t^{p_1}, x_t^{p_2}; p_1, p_2)}_{S_2(x_t^{p_1}, x_t^{p_2}; p_1, p_2)} + 0.25 \cdot$$

$$\underbrace{\sum_{\substack{p_1', p_2' \in N_{t-1} \cup \{none\} \\ \text{such that} \\ p_1' = \text{none or } p_2' = \text{none}}} f_\Delta^1(p_1', p_2', x_t^{p_1}, x_t^{p_2}; p_1, p_2)}_{S_3(x_t^{p_1}, x_t^{p_2}; p_1, p_2)}, x_t^{p_1} = x_t^{p_2},$$

and for $x_t^{p_1} \neq x_t^{p_2}$ $$f_\Delta(x_t^{p_1}, x_t^{p_2}) = (1-P_{flow_2}) \cdot S_1(x_t^{p_1}, x_t^{p_2}; p_1, p_2) + P_{flow_2} \cdot S_2(x_t^{p_1}, x_t^{p_2}; p_1, p_2) + 0.25 \cdot S_3(x_t^{p_1}, x_t^{p_2}; p_1, p_2), x_t^{p_1} \neq x_t^{p_2}. \tag{35}$$

The term inside the summations (which is the first multiplicand inside the sum of (33)) is the joint probability that $I_t$'s pixels $p_1$ and $p_2$ correspond to pixels $p_1'$ and $p_2'$ in $I_{t-1}$, respectively (or correspond to none). This term is similar to $f_1^{-1}(p'; p,t)$, which is the correspondence distribution for a single pixel, although now the conditioning is also on the Boolean variables of $I_t$'s pixels. Calculating the sums in (34) and (35) for a single pair of pixels under one $(x_t^{p_1}, x_t^{p_2})$-hypothesis (out of four different hypotheses) would require estimating this term for a number of cases that is quadratic in the size of the image region for searching corresponding pixels, which we find to be too computationally demanding. (For M=6 pixels, the number of such cases is $(137+1)^2 = 19,044$.) To reduce the computational cost, we replace the exact calculation of the three sums by an estimate based on the marginal PDFs $$f_{\Delta marginal}^1(p', x_t^p; p) \triangleq Pr(p - p' | X_t, I_{t-1}, C_t, X_{t-1}), p \in N_t, p' \in N_{t-1} \cup \{none\}. \tag{36}$$

and obtain estimates for the four likelihoods $$f_\Delta(x_t^{p_1} = b_1, x_t^{p_2} = b_2)(b_1, b_2 \in \{0, 1\}.)$$

In what follows, we first show the calculation of $f_{\Delta marginal}^1$ and $(p_t' x_p^p; p)$, and then present how we use it to obtain an estimate for $f_\Delta(x_t^{p_1}, x_t^{p_2})$.

1) Calculating $f_{\Delta marginal}^1(p', x_t^p; p)$. For $p' \in N_{t-1}$, marginalizing $f_{\Delta marginal}^1(p', x_t^p; p)$ over the correctness of $x_{t-1}^{p'}$; followed by applying the chain rule yields $$f_{\Delta marginal}^1(p', x_t^p; p) = Pr(x_{t-1}^{p'} \text{ is correct}) \cdot Pr(p-p' | x_{t-1}^{p'} \text{ is correct}, X_t, I_{t-1}, C_t, X_{t-1}) + Pr(x_{t-1}^{p'} \text{ is incorrect}) \cdot Pr(p-p' | x_{t-1}^{p'} \text{ is incorrect}, X_t, I_{t-1}, C_t, X_{t-1}).$$

and using the predefined constant $P_{correct}$ leads to $$f_{\Delta marginal}^1(p', x_t^p; p) = P_{correct} \cdot Pr(p-p' | x_{t-1}^{p'} \text{ is correct } X_t, I_{t-1}, C_t, X_{t-1}) + (1-P_{correct}) \cdot Pr(p-p' | x_{t-1}^{p'} \text{ is incorrect } X_t, I_{t-1}, C_t, X_{t-1}).$$

p

This is equal to one of two expressions, depending on the value of $X_t^p$ for which $f_{\Delta marginal}^1$ is calculated:

$$f_{\Delta marginal}^1(p', x_t^p; p) = \tag{37}$$

$$\begin{cases} P_{correct} \cdot Pr\left(p \to p' \middle| x_{t-1}^{p'} \text{ is correct,} \atop X_t, I_{t-1}, C_t, X_{t-1}\right), & x_t^p = x_{t-1}^{p'}, \\ (1-P_{correct}) \cdot Pr\left(p \to p' \middle| x_{t-1}^{p'} \text{ is incorrect} \atop X_t, I_{t-1}, C_t, X_{t-1}\right), & x_t^p \neq x_{t-1}^{p'}. \end{cases} p' \in N_{t-1}.$$

By Bayes' rule, $$Pr(p-p' | x_{t-1}^{p'} \text{ is (in)correct } X_t, I_{t-1}, C_t, X_{t-1}) \propto Pr(p-p' | x_{t-1}^{p'} \text{ is (in)correct } X_t, I_{t-1}, X_{t-1}) \cdot Pr(C_t | p \to p', x_{t-1}^{p'} \text{ is (in)correct } X_t, I_{t-1}, X_{t-1}), p' \in N_{t-1}. \tag{38}$$

As in (26), the prior on the potentially corresponding pixels $p' \in N_{t-1}$ is uniform, but here it is over $I_{t-1}$'s pixels that were assigned a bitmap bit similar to the one of pixel p ((non)-object pixels may only correspond to (non)-object pixels). Based on this and using the Gaussian color distribution as in (26), we obtain $$Pr\left(p-p' \middle| x_{t-1}^{p'} \text{ is correct, } X_t, I_{t-1}, C_t, X_{t-1}\right) \propto \tag{39}$$

$$\underbrace{\frac{1 - P_{none}}{|N_{t-1}| P_{correct} + |N_{t-1} \cap \{q : x_{t-1}^q \neq x_t^p\}|(1 - 2P_{correct})}}_{A_=} \cdot N_{c_{t-1}^{p'}, c}(c_t^p),$$

$$x_t^p = x_{t-1}^{p'}, \text{ and}$$

$$Pr\left(p-p' \middle| x_{t-1}^{p'} \text{ is incorrect, } X_t, I_{t-1}, C_t, X_{t-1}\right) \propto \tag{40}$$

$$\underbrace{\frac{1 - P_{none}}{(|N_{t-1}| + 1) P_{correct} + |N_{t-1} \cap \{q : x_{t-1}^q \neq x_t^p\}|(1 - 2P_{correct})}}_{A_{\neq}} \cdot$$

$$N_{c_{t-1}^{p'}, c}(c_t^p), x_t^p \neq x_{t-1}^{p'}.$$

Note that, as in (26), the denominators of $A_=$ and $A_{\neq}$ are the (expected) number of pixels in $I_{t-1}$ that may correspond to pixel p. These denominators are different from each other and from the denominator in (26), because the probabilities are conditional on $X_t^p$. Substituting these into (37) gives $$f_{\Delta marginal}^1(p', x_t^p; p) \propto \tag{41}$$

$$\begin{cases} P_{correct} \cdot A_= \cdot N_{c_{t-1}^{p'}, c}(c_t^p), & x_t^p = x_{t-1}^{p'}, \\ (1 - P_{correct}) \cdot A_{\neq} \cdot N_{c_{t-1}^{p'}, c}(c_t^p), & x_t^p \neq x_{t-1}^{p'}, \end{cases} p' \in N_{t-1}.$$

$1; p$

For p'=none, the conditioning on $X_t$ has no influence on $f_{\Delta marginal}^1(p',x_t^p;p)$ and using the uniform color distribution as in (27) we obtain $$f_{\Delta marginal}^1(none,x_t^p;p) \propto P_{none} \cdot U(c_t^p) \quad (42)$$

As in (28), the size of the optical flow is restricted and image patches are considered instead of single pixels, which leads the marginal PDFs of the pixel correspondences to finalize into $$f_{\Delta marginal}^1(p', x_t^p; p) \propto \quad (43)$$

$$\begin{cases} P_{correct} \cdot A_= \cdot N_{\bar{c}_{t-1,C}^{p'}}(\bar{c}_t^p) & p' \in \mathcal{D}_{t-1}(p) \text{ and } x_t^p = x_{t-1}^{p'}, \\ (1-P_{correct}) \cdot A_\ne \cdot N_{\bar{c}_{t-1,C}^{p'}}(\bar{c}_t^p), & p' \in \mathcal{D}_{t-1}(p) \text{ and } x_t^p \ne x_{t-1}^{p'}, \\ P_{none} \cdot U(\bar{c}_t^p) & p' = none, \end{cases}$$

where normalizing to a unit sum over the "generalized neighborhood" of p. $D_{t-1}(p) \cup \{none\}$, produces the correct probabilities.

2) Estimating $f_\Delta(x_t^{P1}, x_t^{P2})$: The third sum in (34) and (35), which is the probability that at least one of the two pixels has no corresponding pixel in the previous frame, is $$S_3(x_t^{P1}, x_t^{P2}: p_1, p_2) = \quad (44)$$

$$\sum_{p_2' \in N_{t-1} \cup \{none\}} f_\Delta^1(none, p_2', x_t^{P1}, x_t^{P2}; p_1, p_2) +$$

$$\sum_{p_1' \in N_{t-1} \cup \{none\}} f_\Delta^1(p_1', none, x_t^{P1}, x_t^{P2}; p_1, p_2) -$$

$$f_\Delta^1(none, none, x_t^{P1}, x_t^{P2}; p_1, p_2) = f_{\Delta marginal}^1(none, x_t^{P1}; p_1) +$$

$$f_{\Delta marginal}^1(none, x_t^{P2}; p_2) - f_\Delta^1(none, none, x_t^{P1}, x_t^{P2}; p_1, p_2),$$

and modeling the events $p_1'$=none and $p_2'$=none as independent, we obtain $$S_3(x_t^{P1},x_t^{P2};p_1,p_2) = f_{\Delta marginal}^1(none,x_t^{P1};p_1) + f_{\Delta marginal}^1(none,x_t^{P2};p_2) - f_{\Delta marginal}^1(none,x_t^{P1};p_1) \cdot f_{\Delta marginal}^1(none,x_t^{P2};p_2). \quad (45)$$

Turning to $S_1(x_t^{P1},x_t^{P2};p_1,p_2)$, which is the probability that the two pixels have identical discrete optical flows from the previous frame, and denoting $$k(x_t^{P1},x_t^{P2};p_1,p_2) \triangleq 1 - f_{\Delta marginal}^1(none,x_t^{P1};p_1) \cdot f_{\Delta marginal}^1(none,x_t^{P2};p_2) \quad (46)$$

it is easy to verify the bounds $$\sum_{\substack{p_1',p_2' \in N_{t-1} \text{ such that} \\ \Delta_{t-1}(p_1',p_2')=\Delta_t(p_1,p_2)}} \max\{0, f_{\Delta marginal}^1(p_1', x_t^{P1}; p_1) + \quad (47)$$

$$f_{\Delta marginal}^1(p_2', x_t^{P2}; p_2) - k(x_t^{P1}, x_t^{P2}; p_1, p_2)\} \le$$

$$S_1(x_t^{P1}, x_t^{P2}; p_1, p_2) \le \sum_{\substack{p_1',p_2' \in N_{t-1} \text{ such that} \\ \Delta_{t-1}(p_1',p_2')=\Delta_t(p_1,p_2)}} \min$$

$$\{f_{\Delta marginal}^1(p_1', x_t^{P1}; p_1), f_{\Delta marginal}^1(p_2', x_t^{P2}; p_2)\}.$$

The upper bound is directly obtained from the fact that the joint probability of two events is not larger than the marginal probability of any of the individual events. The lower bound is obtained by bounding the probability of the event that $p_1 \to p_1'$ or $p_2 \to p_2'$ by $I_t(x_t^{P1},x_t^{P2};p_1,p_2)$ from above.

By complementing, the second sum in (34) and (35), which is the probability of having different discrete optical flows, is $$S_2(x_t^{P1},x_t^{P2};p_1,p_2) = 1 - S_3(x_t^{P1},x_t^{P2};p_1,p_2) - S_1(x_t^{P1},x_t^{P2};p_1,p_2). \quad (48)$$

Equations (45)-(48) induce immediate bounds on $f_\Delta(x_t^{P1},x_t^{P2})$ $$\text{lower}(x_t^{P1},x_t^{P2}) \le f_\Delta(x_t^{P1},x_t^{P2}) \le \text{upper}(x_t^{P1},x_t^{P2}) \quad (49)$$

Thus, for each unordered pair of adjacent pixels $p_1$ and $p_2$ in $I_t$, there are the four intervals $$\begin{cases} \text{lower}(x_t^{P1}=0, x_t^{P2}=0) \le f_\Delta(x_t^{P1}=0, x_t^{P2}=0) \le \text{upper}(x_t^{P1}=0, x_t^{P2}=0), \\ \text{lower}(x_t^{P1}=0, x_t^{P2}=1) \le f_\Delta(x_t^{P1}=0, x_t^{P2}=1) \le \text{upper}(x_t^{P1}=0, x_t^{P2}=1), \\ \text{lower}(x_t^{P1}=1, x_t^{P2}=0) \le f_\Delta(x_t^{P1}=1, x_t^{P2}=0) \le \text{upper}(x_t^{P1}=1, x_t^{P2}=0), \\ \text{lower}(x_t^{P1}=1, x_t^{P2}=1) \le f_\Delta(x_t^{P1}=1, x_t^{P2}=1) \le \text{upper}(x_t^{P1}=1, x_t^{P2}=1). \end{cases} \quad (50)$$

Figure 13A:
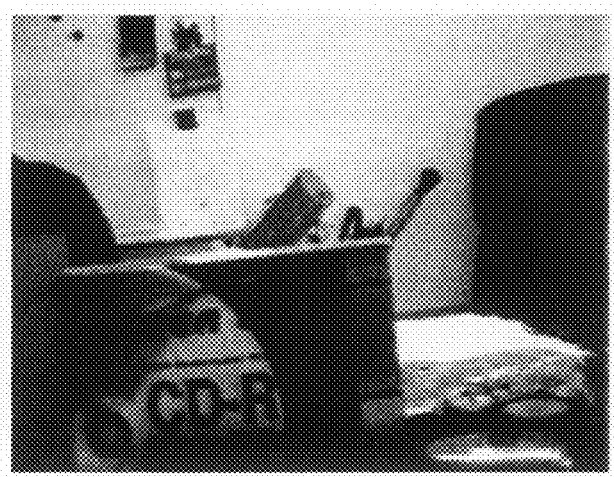
FIG. 13B shows the histogram of the $f_A$s interval sizes computed for the object marked in FIG. 13A (the largest interval out of the four is taken per pixel). We see that a large portion of the $f_A$s have small intervals and thus affect the bitmap's PDF.
Figure 13B:
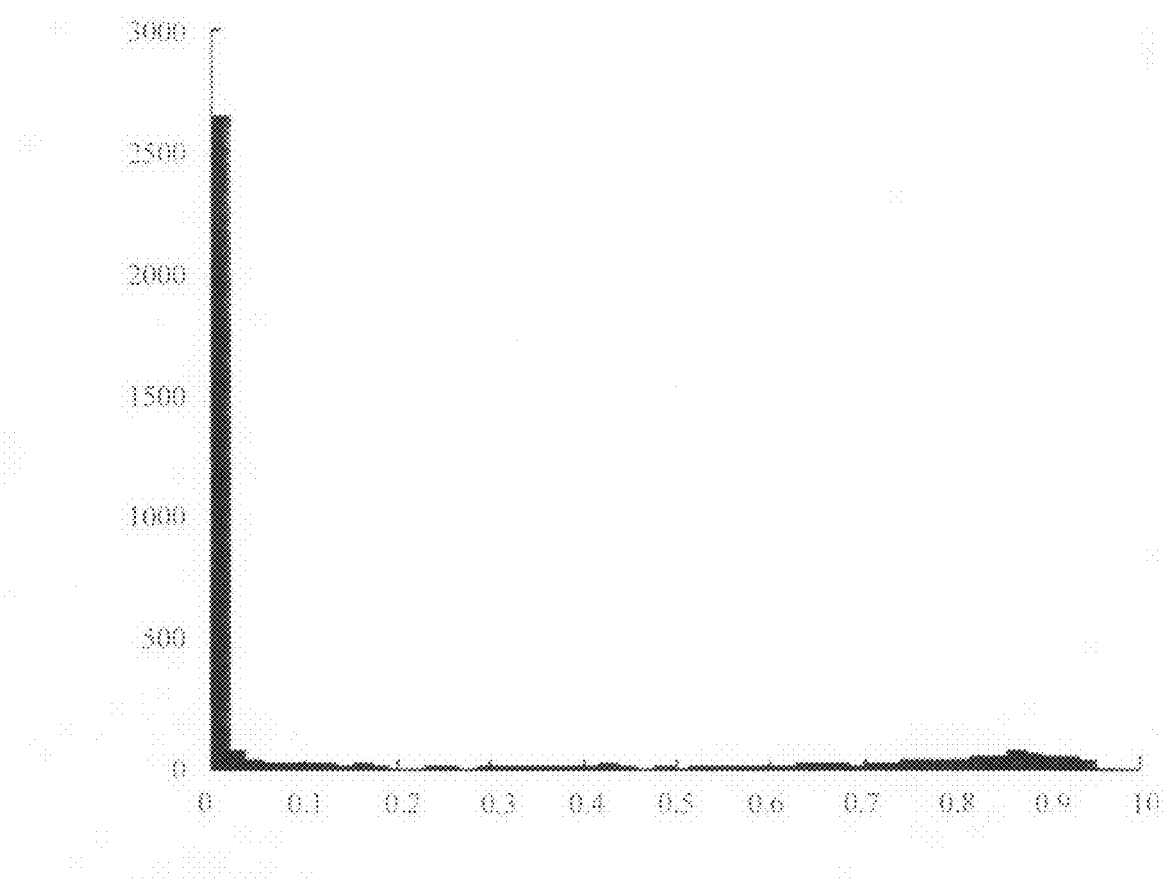

Avoiding additional computations, we take only these interval restrictions into account and set the four likelihoods $f_\Delta(x_t^{P1}=b_1, x_t^{P2}=b_2)$ ($b_1, b_2, \in \{0,1\}$), under these interval restrictions, to be as close to each other as possible so that the sum of their differences $$\frac{1}{2} \sum_{(b_1,b_2) \in \{0,1\}^2} \sum_{(b_1',b_2') \in \{0,1\}^2} |f_\Delta(x_t^{P1}=b_1, x_t^{P2}=b_2) - f_\Delta(x_t^{P1}=b_1', x_t^{P2}=b_2')| \quad (51)$$

is minimized. (A minimization method is given next paragraph.) Note that if $f_\Delta(x_t^{P1},x_t^{P2})$ is equal for all four possible bit-assignments, it will have no effect at all on the maximization of the bitmap PDF (3), which is proportional to it. Qualitatively, by closely clustering the four values $f_\Delta(x_t^{P1},x_t^{P2})$, the effect on the bitmap's PDF is minimized while the interval restrictions are obeyed. Therefore, the larger the uncertainty (i.e. interval) in the values of $f_\Delta(x_t^{P1},x_t^{P2})$ the less the effect of this component on the bitmap's PDF. It is easily seen through (47) that the more unequivocal the marginal optical flows $f_{\Delta marginal}^1(p_1', x_t^{P1}; p_1)$ and $f_{\Delta marginal}^1(p_2', x_t^{P2}; p_2)$ the smaller these uncertainties. A typical histogram of these interval sizes is presented in FIG. 13B (the largest interval out of the four is taken per pixel), showing that indeed a large portion of the $f_\Delta$s have small intervals and thus significantly affect the bitmap's PDF.

The minimization of (51) within the intervals of (50) may be easily accomplished by algorithm Minimize hereinafter.

Algorithm Minimize

Input: $\{[\text{lower } (x^{p1}{}_t = b_1, x^{p2}{}_t = b_2)$
upper $(x^{p1}{}_t = b_1, x^{p2}{}_t = b_2)]\}_{b_1,b_2 \in \{0,1\}}$.
Output: $\{f_\Delta (x^{p1}{}_t = b_1, x^{p2}{}_t = b_2)\}_{b_1,b_2 \in \{0,1\}}$.

1) Sort the eight interval bounds
$\{\text{lower } (x^{p1}{}_t = b_1, x^{p2}{}_t = b_2)\}_{b_1,b_2 \in \{0,1\}} \cup$
$\{\text{upper } (x^{p1}{}_t = b_1, x^{p2}{}_t = b_2)\}_{b_1,b_2 \in \{0,1\}}$
in ascending order.
2) Measure for each adjacent pair of bounds $\text{bound}_1$ and $\text{bound}_2$ (seven pairs) the sum of differences (51) obtained by setting each of the four $f_\Delta (x^{p1}{}_t, x^{p2}{}_t)$'s most closely to $$\frac{\text{bound}_1 + \text{bound}_2}{2}$$

within its interval.
3) Out of the seven settings choose the setting of the $f_\Delta (x^{p1}{}_t, x^{p2}{}_t)$'s that had the smallest sum of differences.

The setting provided by the algorithm is an optimal one, as proven in the following. Proof: Since the sum of differences (51) is continuous in the $f_\Delta$s, we assume w.l.o.g. (without any loss of generality) that the eight bounds are all different.

First, observe that in an optimal setting of the four values, each of them is set, within its interval, as close as possible to the median of the four. This is easy to see by supposing that one of the four values is not as close as possible to the median. Then obviously it can be brought closer and thus reduce the sum of differences (51), which means that the setting is not optimal.

Therefore, the search for an optimal setting may be performed, in principle, by going over all points v between the two extreme bounds, setting for each such point the four values as close as possible to it, and choosing a setting of the smallest sum of differences. We refer to such a point v as a "potential median" and to the four closest values as its corresponding values. Note that a "potential median" may not be the actual median of its four corresponding values. However, such "potential medians" may be discarded.

Now, note that a "potential median" v is the actual median of the corresponding four values only if it belongs to 4, 2, or 0 intervals. In the first and third cases the sum of differences is equal for all "potential medians" in the range between the two bounds that are closest to v. This is also true for the second case if v is the actual median of the four values. (The proof is straightforward.)

The correctness of the minimization algorithm now immediately follows.

To conclude the steps for computing $f_\Delta(x_t^{p1}, x_t^{p2})$ for a pair of adjacent pixels $p_1$ and $p_2$ in $I_t$, we first use equation (43), followed by normalization, to compute the probabilities $f_{\Delta marginal}{}^1(p', x_t^p; p)$ for $p' \in D_{t-1}(p) \cup \{\text{none}\}$, that is, the probabilities for pixel p's different correspondences to pixels in $I_{t-1}$, (feasible subject to the maximal optical flow assumed) under each of the two $X_t^p$-hypotheses. Then, using (45)-(48) for the sums in (34) and (35), we obtain the intervals (50), within which we set the four values of $f_\Delta(x_t^{p1}, x_t^{p2})$ so that (51) is minimized by the method explained. We remark that most of the computations in (43) are the computations of Gaussian densities and their products, which are also performed in the computation of (28). This may be taken advantage of in order to reduce computation time.

Although the invention has been described in detail, nevertheless changes and modifications which do not depart from the teachings of the present invention, will be evident to those skilled in the art. Such changes and modifications are deemed to come within the purview of the present invention and the appended claims.

The invention claimed is:

1. A method for visually tracking a target object silhouette in a plurality of video frames, the target object silhouette being identified by a bitmap classifying whether each pixel belongs to said target object silhouette, the method comprising the steps of:
   (i) approximating a probability distribution function (PDF), which assigns a probability to each possible bitmap in a given video frame; and
   (ii) estimating the maximum a posteriori bitmap of said target object silhouette in each video frame in order to classify whether each pixel in a given video frame belongs to said target object silhouette.

2. A method according to claim 1, wherein a Gibbs distribution is used in order to approximate said PDF.

3. A method according to claim 1, wherein said target object silhouette comprises more than one item.

4. A method according to claim 1, wherein more than one target object silhouette are tracked on each video frame.

5. A method according to claim 1, wherein the PDF of the target object silhouette's bitmap in the current frame is conditional on the current and previous frames, as well as on the bitmap in the previous frame.

6. A method according to claim 1, wherein the target's bitmap PDF is marginalized over all possible motions per pixel.

7. A method according to claim 1, wherein said target object silhouette to be tracked is marked with an initial marking, such that said initial marking of said target object silhouette to be tracked does not cover the entire zone of the target object silhouette and tracking the target object silhouette over several video frames will substantially increase the matching of the marking with the target object silhouette.

8. A method according to claim 1, wherein said target object silhouette to be tracked is marked with an initial marking, such that said initial marking of said target object silhouette to be tracked erroneously covers an area outside the target object silhouette and tracking the target object silhouette over several video frames will substantially remove the marking outside the target object silhouette.

9. A system for visually tracking a target object silhouette in a plurality of video frames, the target object silhouette being identified by a bitmap classifying whether each pixel belongs to said target object silhouette, the system comprising:
   a computer processor configured to:
   (i) approximate a probability distribution function (PDF), which assigns a probability to each possible bitmap in a given video frame; and
   (ii) estimate the maximum a posteriori bitmap of said target object silhouette in each video frame in order to classify whether each pixel in a given video frame belongs to said target object silhouette.

10. A system according to claim 9, wherein a Gibbs distribution is used in order to approximate said PDF.

11. A system according to claim 9, wherein said target object silhouette comprises more than one item.

12. A system according to claim 9, wherein more than one target object silhouette are tracked on each video frame.

13. A system according to claim 9, wherein the PDF of the target object silhouette's bitmap in the current frame is conditional on the current and previous frames, as well as on the bitmap in the previous frame.

14. A system according to claim 9, wherein the target's bitmap PDF is marginalized over all possible motions per pixel.

15. A system according to claim 9 wherein the initial marking of said target object silhouette to be tracked does not cover the entire zone of the target object silhouette and tracking the target object silhouette over several video frames will substantially increase the matching of the marking with the target object silhouette.

16. A system according to claim 9, wherein the initial marking of said target object silhouette to be tracked erroneously covers an area outside the target object silhouette and tracking the target object silhouette over several video frames will substantially remove the marking outside the target object silhouette.

* * * * *